United States Patent
Shiode et al.

(10) Patent No.: US 9,416,329 B2
(45) Date of Patent: Aug. 16, 2016

(54) APPARATUS AND PROCESS FOR PRODUCTION OF NANOBUBBLE LIQUID

(75) Inventors: Keijiro Shiode, Tokyo (JP); Tsuneo Ishii, Tokyo (JP); Yoshihide Kawani, Tokyo (JP); Hideki Yamaguchi, Tokyo (JP); Minoru Koide, Tokyo (JP)

(73) Assignee: OPT CREATION, INC., Tokyo (JP)

( * ) Notice: Subject to any disclaimer, the term of this patent is extended or adjusted under 35 U.S.C. 154(b) by 888 days.

(21) Appl. No.: 12/518,437

(22) PCT Filed: Dec. 11, 2007

(86) PCT No.: PCT/JP2007/073848
§ 371 (c)(1),
(2), (4) Date: Nov. 16, 2009

(87) PCT Pub. No.: WO2008/072619
PCT Pub. Date: Jun. 19, 2008

(65) Prior Publication Data
US 2010/0077650 A1   Apr. 1, 2010

(30) Foreign Application Priority Data
Dec. 11, 2006   (JP) .................................. 2006-332855

(51) Int. Cl.
*C10L 1/10*   (2006.01)
*C10L 1/32*   (2006.01)
(Continued)

(52) U.S. Cl.
CPC ............... *C10L 1/328* (2013.01); *B01F 3/0807* (2013.01); *B01F 5/0465* (2013.01); *C10G 31/06* (2013.01);
(Continued)

(58) Field of Classification Search
CPC .. B82Y 40/00; B82Y 99/00; B01J 2219/0877
USPC ........................................... 44/629, 639, 300
See application file for complete search history.

(56) References Cited

U.S. PATENT DOCUMENTS 4,676,849 A * 6/1987 Curtin et al. ....................... 149/2
8,726,918 B2 * 5/2014 Watanabe ............ B01F 3/0446
                                                        134/102.1
(Continued)

FOREIGN PATENT DOCUMENTS

| JP | 5-9479  | 1/1993 |
|----|---------|--------|
| JP | 5-98272 | 4/1993 |

(Continued)

OTHER PUBLICATIONS

Mahcine Translation of JP H08-217421.*
(Continued)

*Primary Examiner* — Ellen McAvoy
*Assistant Examiner* — Ming Cheung Po
(74) *Attorney, Agent, or Firm* — Sughrue Mion, PLLC

(57) ABSTRACT

An apparatus and process for production of a liquid containing fuel that avoid the need to add any extra surfactant and also the need to apply ultrasonic wave energy and attain high stability of minute bubbles, etc. Production apparatus for a liquid containing fuel comprises pump for pressurizing a stored fuel and nanobubble generating unit adapted to inject a liquid containing the pressurized fuel. The apparatus may be equipped with homogenizing means for storing the liquid containing fuel. The process for production of a liquid containing fuel is characterized by sequentially performing storing of a liquid containing fuel in storage means, pressurizing the liquid so as to obtain a high-pressure liquid with a given pressure, injecting the same through a nozzle into a matrix of liquid containing fuel and effecting collision thereof with a wall so that nanobubbles of foreign substance are dispersed in the matrix of liquid containing fuel.

5 Claims, 15 Drawing Sheets

(51) Int. Cl.

| | |
|---|---|
| *C10G 31/06* | (2006.01) |
| *F02M 25/022* | (2006.01) |
| *F02M 27/04* | (2006.01) |
| *F02M 55/00* | (2006.01) |
| *F02M 61/02* | (2006.01) |
| *F02M 25/12* | (2006.01) |
| *F02D 19/06* | (2006.01) |
| *F23K 5/08* | (2006.01) |
| *B01F 5/04* | (2006.01) |
| *B01F 3/08* | (2006.01) |

(52) U.S. Cl.
CPC ....... *F02D 19/0671* (2013.01); *F02M 25/0224* (2013.01); *F02M 25/0228* (2013.01); *F02M 25/12* (2013.01); *F02M 27/04* (2013.01); *F02M 55/00* (2013.01); *F02M 61/02* (2013.01); *F23K 5/08* (2013.01); *F02M 2200/95* (2013.01); *F23K 2301/103* (2013.01); *Y02T 10/121* (2013.01); *Y02T 10/36* (2013.01)

(56) References Cited

U.S. PATENT DOCUMENTS

| | | | |
|---|---|---|---|
| 2007/0023546 A1* | 2/2007 | Yu | 239/589 |
| 2007/0189972 A1* | 8/2007 | Chiba | A61K 49/223 |
| | | | 424/9.52 |

FOREIGN PATENT DOCUMENTS

| | | | | |
|---|---|---|---|---|
| JP | H08-217421 | * | 8/1996 | ............ C10B 15/027 |
| JP | 9-280122 | | 10/1997 | |
| JP | 2001-348581 | | 12/2001 | |
| JP | 2002-191950 | | 7/2002 | |
| JP | 2002-200486 | | 7/2002 | |
| JP | 2003-96477 | | 4/2003 | |
| JP | 2003-265938 | | 9/2003 | |
| JP | 2003-334548 | | 11/2003 | |
| JP | 2004-67913 | | 3/2004 | |
| JP | 2004-76608 | | 3/2004 | |
| JP | 2004-121962 | | 4/2004 | |
| JP | 2004-191027 | | 7/2004 | |
| JP | 2005-138035 | | 2/2005 | |
| JP | 2005-95877 | | 4/2005 | |
| JP | 2005-246294 | | 9/2005 | |
| JP | 2006-181449 | | 7/2006 | |
| JP | 2006-241243 | | 9/2006 | |
| JP | 2006-263505 | | 10/2006 | |
| JP | 2006-263641 | | 10/2006 | |
| JP | 2006-314972 | | 11/2006 | |
| WO | WO 2005/115596 | | 12/2005 | |
| WO | WO 2006/104241 | | 10/2006 | |

OTHER PUBLICATIONS

Official Action issued in Patent Application No. 2008-531052 on Oct. 22, 2008.

Official Action issued in Patent Application No. 2008-335148 on Apr. 3, 2009.

Official Action issued in Patent Application No. 2008-335148 on Aug. 7, 2009.

* cited by examiner

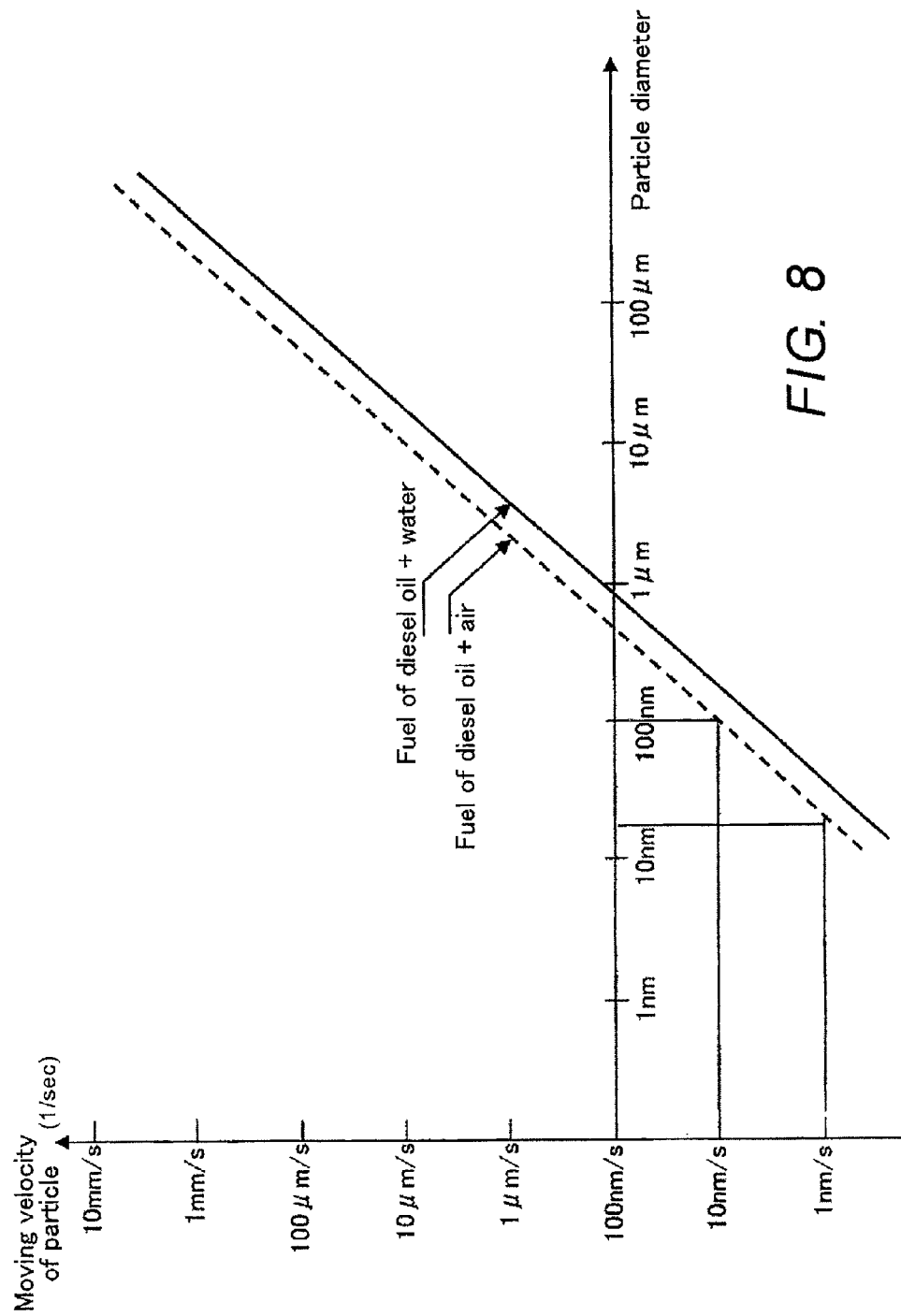

| Processing | In processing with moist hydroxy gas and nanobubble generation | | | Temporal change after processing with moist hydroxy gas and nanobubble generation | | | | | | | | | |
|---|---|---|---|---|---|---|---|---|---|---|---|---|---|
| Time | min | | | hr | | | | day | | | | | |
|  | 0 | 0.1 | 5'36" | 0 | 1 | 3 | 5 | 1 | 2 | 3 | 4 | 6 | 7 |
| ORP (mV) In processing with moist hydroxy gas and nanobubble generation Open | 546 | -450 | -450 | | | | | | | | | | |
| After processing with moist hydroxy gas and nanobubble generation Close | | | | -450 | -450 | -447 | -430 | -298 | -115 | -60 | -30 | 94 | 247 |
| pH | 6.01 | 6.01 | 5.97 | 5.97 | 5.98 | 5.98 | 6.04 | 6.00 | 6.23 | 6.48 | 6.75 | 6.62 | 6.59 |

APPARATUS AND PROCESS FOR PRODUCTION OF NANOBUBBLE LIQUID

FIELD OF THE INVENTION

The present invention relates to a manufacturing apparatus for and a method of manufacturing a liquid including nanobubble (hereinafter, referred to as "nanobubble liquid"). The nanobubble liquid can, in particular, improve a combustion efficiency mainly in an internal-combustion engine and include a desirable fuel for cleaning an exhaust gas. And, the nanobubble liquid may include water such as tap water to be expected to achieve high performance.

BACKGROUND ART

Recently, it has attracted attention to reform a liquid with nanobubbles. On the other hand, it is strongly desired to improve the mileage or combustion efficiency of a diesel engine and a gasoline engine and it is also strongly desired to reduce the amount of harmful substance in an exhaust gas to be discharged. Therefore, it is desired to reform the fuel and to make the fuel capable of high performance.

For example, in the diesel engine, $NO_x$ is generated as air and oxygen coexist in a high temperature condition when combustion occurs in the engine cylinder. As the way to reduce the generation of the $NO_x$, it can be cited to complete the combustion in a short period of time, but it causes an increase of generation of PM (Particulate Matter). In order to avoid these issues, as the way to prevent the temperature increase inside the cylinder, which causes the generation of the $NO_x$, while avoiding the combustion in the short period of time, it has been considered to utilize a water-in-oil (W/O) type water emulsion fuel.

By adopting the water emulsion fuel, it is expected (a) to prevent the temperature increase in the cylinder due to the latent heat of vaporization of water when combustion occurs, and further (b) to assist in the fuel atomization by the micro explosion of water.

As the prior art to manufacture the emulsion fuel, a method of utilizing a surfactant is disclosed (Patent Document 1). Further, another technology is disclosed, in which high-frequency vibration generated by a vibrator made of a magnetostrictive material and a piezoelectric device, or a giant magnetostrictive material is applied, then cavitation is caused in a mixture liquid of the fuel and water, and a high-density emulsion fuel containing ultra fine water particles dispersed and mixed in the fuel is produced (Patent Document 2). And a fuel modification device for the internal combustion engine is disclosed, the device comprising: a modification tank storing gasoline and water inside; and fine bubble introduction means for emulsifying the mixture liquid of the gasoline and water (Patent Document 3), but it is inferred that fine water particles are stabilized in the fuel for the internal combustion engine by the effect of the electrostatic polarization in a similar manner of the surfactant (Patent Document 3) probably because the fine bubbles are generated by utilizing the ultrasonic wave (Patent Documents 4 and 5).

[Patent Document 1] Japanese Patent Application Publication No. 2004-67913
[Patent Document 2] Japanese Patent Application Publication No. 2004-76608
[Patent Document 3] Japanese Patent Application Publication No. 2006-241243
[Patent Document 4] Japanese Patent Application Publication No. 2003-334548
[Patent Document 5] Japanese Patent Application Publication No. 2004-121962

DISCLOSURE OF THE INVENTION

Problem to be Solved by the Invention

However, in accordance with the technology described in Patent Document 1, the surfactant is required to generate the emulsion fuel such that an additional cost is required. And according to the technology described in Patent Document 2, a large amount of energy of the ultrasonic wave is necessary when the emulsion fuel is produced such that the fuel consumption may be deteriorated by the emulsion fuel. In the technologies described in Patent Documents 3 to 5, the introduction of fine bubbles is made by utilizing the ultrasonic wave such that questions may still remain with the stability of the emulsion fuel. And only emulsification of the gasoline and water is the subject technology such that the generalization of the raw materials and general-purpose of the technologies may not be enough. Further, not only the fuel, but also the water itself is expected to have high functionality, which is not necessarily achieved.

Means to Solve the Problem

In the present invention, therefore, a fuel manufacturing apparatus and a fuel manufacturing method for manufacture a fuel containing fine bubbles in a stabilized state without ultrasonic wave energy or without addition of an extra surfactant is provided. The fuel manufacturing apparatus comprises: pressurizing means for pressurizing a stored fuel; and ultra fine granulating means for injecting (jetting) the pressurized fuel (hereinafter, "ultra fine particle" is referred to as "nanobubble", "ultra fine granulation" is referred to as "nanobubble generation", and "ultra fine granulating means" is referred to as "nanobubble generation means"). Further, the fuel manufacturing method comprises the steps of: storing the fuel in storage means; making the fuel to be pressurized at a predetermined pressure by pressuring the stored fuel; injecting the highly-pressurized fuel through a nozzle into a fuel matrix so as to collide on a wall; and dispersing nanobubbles constituted of foreign material in the fuel matrix. And instead of the fuel, the water in which nanobubbles are generated by the nanobubble generation means has excellent properties.

Specifically, the following is provided.

(1) An apparatus for production of a fuel comprising: pressurizing means for pressurizing a stored fuel; and nanobubble generation means for injecting (jetting) the pressurized fuel may be provided.

(2) The apparatus for production of the fuel according to the above (1), further comprising: homogenizing means for storing at least fluid state fuel may be provided.

Here, the fuel in a liquid state may include, for example, gasoline, diesel oil, heavy oil, other mineral oils, hydrocarbon compound, and a mixture thereof, and may further include alcohol such as methanol and ethanol and a derivative thereof in some cases. And the liquid state may refer to being capable of flowing in an ordinary condition (e.g., in the air, at the room/normal temperature). Therefore, what is in the liquid state may include a liquid by itself and a mixture of the liquid with a solid and/or gas. The homogenizing means may include a apparatus, a device, and an instrument capable of homogenizing even partially the content of the fuel in such a liquid state (for example, concentrate and dilute portions of dissolved solutes and high- and low-density portions of dispersed matter), such that it may include a simple container such as a tank. By the homogenizing means, if so-called nanobubbles are floating or dispersed in the liquid, dispersed distribution of the nanobubbles and distributions of mass averages, volume averages, number averages per unit volume of nanobubbles can be at least partially homogenized. Various technologies such as fuel flow in the homogenizing means (e.g., convection), settling/floating based on differences of specific gravity, agitation by an agitator can be utilized for the homogenization.

The pressurizing means can refer to, as an example, a pump capable of making the pressure of the fuel increase. And the nanobubble generation means may refer to what can generate nanobubbles which may include particles including air bubbles as usually called and liquid droplets (nanobubble generation). The nanobubbles can be generated in the fuel and kept floating or dispersed as they are for a long period of time.

(3) The apparatus for production of the fuel according to the above (2), further comprising: separation means for circulating part of the fuel in which nano-bubbles have been generated by the injection into the homogenizing means so as to be further treated by the pressurizing means and the nanobubble generation means may be provided.

Here, the fuel subject to the nanobubble generation may mean the fuel containing nanobubbles. It is considered that the nanobubbles may be generated when highly pressurized fluid (mainly liquid) is injected into a fluid (or a fluid matrix) having so slow flow rate that the fluid is substantially static or may be regarded as static at a lower pressure than that of the injected fluid. Here, the flow rate of the injected highly-pressurized fluid is affected by a diameter of the ejection hole (or nozzle), a length, a pressure difference between the two fluids, and the like. Generally speaking, the injection velocity is higher as the pressure difference is more. And once the pressurized fluid is injected, it is considered that the internal pressure of the injected fluid is drastically reduced to the ambient pressure (close to the pressure of the fluid matrix). On the other hand, in case the injected fluid collides upon a wall or the like, the pressure at the collision point is increased such that the nanobubbles can be easily generated at the collision point.

The separation means may mean a device, an instrument, and the like capable of separating portions with high density of nanobubbles (in terms of number, volume, or weight) from portions with low density thereof. For example, it is quite likely that a fuel matrix close to the nanobubble generation means contains more nanobubbles such that the fuel taken from such position close to the nanobubble generation means may be fed to the production tank as a nanobubble-rich fluid separately from the fuel taken from other positions, or a fluid taken from positions in which fluids exist as the fuel contained in the same container although such positions are far from the nanobubble generation means can be circulated to the homogenizing means as a nanobubble-lean fluid while the nanobubble-rich fluid is being taken away.

The separation means can adopt various types of separation means and separation methods such as a separation utilizing a filter, and an accelerated separation utilizing a centrifugal force or a separation by a simple precipitation method utilizing density differences between the nanobubbles (considered mainly to be air bubbles) and the fuel matrix. In the separation utilizing the filter, the separation means may have a function to preclude nanobubbles having a predetermined size or larger. The nanobubbles having the predetermined size or larger have relatively higher moving velocities in the fuel matrix such that it becomes easier to be separated and the fuel containing such nanobubbles are not suitable for a long storage life. Therefore, the quality management may be made based on this. The separation means may include a valve (e.g., three-way valve) to divide the incoming fluid flow into two ways.

(4) The apparatus for production of the fuel according to the above (2) or (3), further comprising: ionization means for ionizing the stored fuel such that the thus-ionized fuel is fed to the pressurizing means may be provided.

Here, the ionization means may include a reaction container where a ceramic formed body in which aluminum oxide and barium titanate are dispersed. The fuel is ionized by letting the fuel pass inside such container (i.e., contact the ceramics). An example of such ceramic formed body may be, for example, a mixture of barium carbonate, titanium oxide, and aluminum oxide having been fired with clay as a binder in a temperature range from about 1000° C. to about 1500° C. In case the cross sectional flow area changes drastically inside the ionization means and the flow direction is horizontal, the flow rate is drastically lowered and a fluid having a large specific gravity is stagnated near the bottom. The separation based on differences of the specific gravities progresses there and the mixing ration of fluids changes temporarily. In case the amount of the fluids charged at one time is not much, the mixing ratio of the total fluids is changed. Therefore, it is preferable to design a component having such a drastic change in the cross sectional flow area to be arranged in a vertical configuration such that the fluids flow uniformly even though the flow rate changes.

(5) The apparatus for production of the fuel according to any one from the above (2) to (4) further comprising: foreign material addition means for injecting (jetting) fluid state foreign material having been highly-pressurized may be provided.

Here, foreign substance in a fluid state which is pressurized at a high pressure may be, by way of example, gas such as oxygen and nitrogen and aqueous fluid such as water and aqueous solution of compound. If the fuel is, for example, a liquid of hydrocarbon substance, a liquid of alcohol substance such as ethanol may be a foreign substance in a fluid state. If the fuel is, for example, a liquid of hydrocarbon substance, a liquid of alcohol substance such as ethanol may be a foreign substance in a fluid state. Therefore, the foreign substance may mean such substance is difficult to dissolve mutually for homogenization. And the substance referred hereto may include a material. In the embodiment, therefore, what is expressed by "material" can be included in "substance". For example, a phrase including "material" can belong to a subordinate concept of the phrase in which "material" is replaced with "substance" as "foreign substance addition means" includes "foreign material addition means".

(6) The apparatus for production of the fuel according to any one from above (2) to (5) may be provided such that the nanobubble generation means comprises: a nozzle which injects the pressurized fuel and a wall on which the injected fuel is collided and wherein nanobubbles constituted of foreign material are dispersed in a fuel matrix.

Here, it is preferable that the nozzle for injection has the following shape.

Diameter of the Hole:

It is 0.1 mm to 1 mm and more preferably 0.2 mm to 0.5 mm.

Length of the Hole:

It is ten times as long as the diameter or even longer. More preferably, 10 to 15 times as long as the diameter.

Material:

High wear resistance and high corrosion resistance. For example, HRC is 60 or more if made of stainless steel.

(7) The apparatus for production of the fuel according to the above (6) may be provided such that the nozzle comprises a hard ceramic ring.

Here, the ceramic ring may be made of various kinds of ceramics such as alumina, silicon nitride, silicon carbide, and so on and it is more preferable that it is made of alumina in consideration of the wear resistance (hardness), the corrosion resistance, the cost, the usability, and so on. It is generally called Sapphire Ring based on the mineral name.

(8) The apparatus for production of the fuel according to the above (6) may be provided such that fine particles that are substantially insoluble in the fuel matrix are mixed.

Such fine particles are made of various kinds of substance such as metal, inorganic compound, and fly ash. For example, they may include powdered oyster shell manufactured by firing oyster shell and pulverizing the fired oyster shell. The powder is a component of the crude drug and listed as "oyster shell (borei)" in the Japanese Pharmacopoeia. It has efficacy in acid suppression, assuagement, defervescence, and so on and may be used for Chinese crude drug such as Keishi-ka-ryukotsu-borei-to and Saiko-ka-ryukotsu-borei-to. The component is native calcium carbonate.

(9) A method of manufacturing a liquid fuel, comprising the steps of: storing the fuel in storage means; making the fuel to be pressurized at a predetermined pressure by pressuring the stored fuel; injecting the highly-pressurized fuel through a nozzle into a fuel matrix so that the injected fuel collides on a wall; and dispersing nanobubbles constituted of foreign material in the fuel matrix, may be provided.

Here, nanobubbles made of the foreign substance are solid particles if the substance is solid. They may be liquid droplets if the substance is liquid. For example, if a water-oil system emulsion is formed, an oil-in-water (O/W type) emulsion or a water-in-oil (W/O type) emulsion is generally configured. And if the substance is gas, the nanbubbles may be air foams or bubbles.

(10) The method of manufacturing the fuel according to the above (9), comprising the steps of: ionizing the fuel stored by the storage means; and making the ionized fuel to be pressurized at the predetermined pressure by pressuring the stored fuel, may be provided.

(11) The method of manufacturing the fuel according to the above (9) or (10), comprising the steps of: separating part of the fuel in which nanobubbles are dispersed; circulating the separated fuel into the storage means; and mixing the circulated fuel and unprocessed fuel in the storage means, may be provided.

Here, the unprocessed fuel may mean a fuel having not been processed by the nanobubble generation means. Thus, what has been processed by the nanobubble generation means and what has not been processed are mixed such that more nanobubbles can be contained accumulatively. The details will be described later.

(12) The method of manufacturing the fuel according to any one from the above (9) to (11), comprising the step of: dispersing nanobubbles constituted of foreign material in the fuel matrix, may be provided.

Effect of the Invention

In a fuel manufacturing apparatus and a fuel manufacturing method according to the present invention, it is possible to introduce stable nanobubbles in the fuel and to produce manufactured fuel having various excellent properties.

BRIEF DESCRIPTION OF THE DRAWINGS

FIG. 8 shows the relationship between a particle diameter and a moving velocity.

Figure 1:
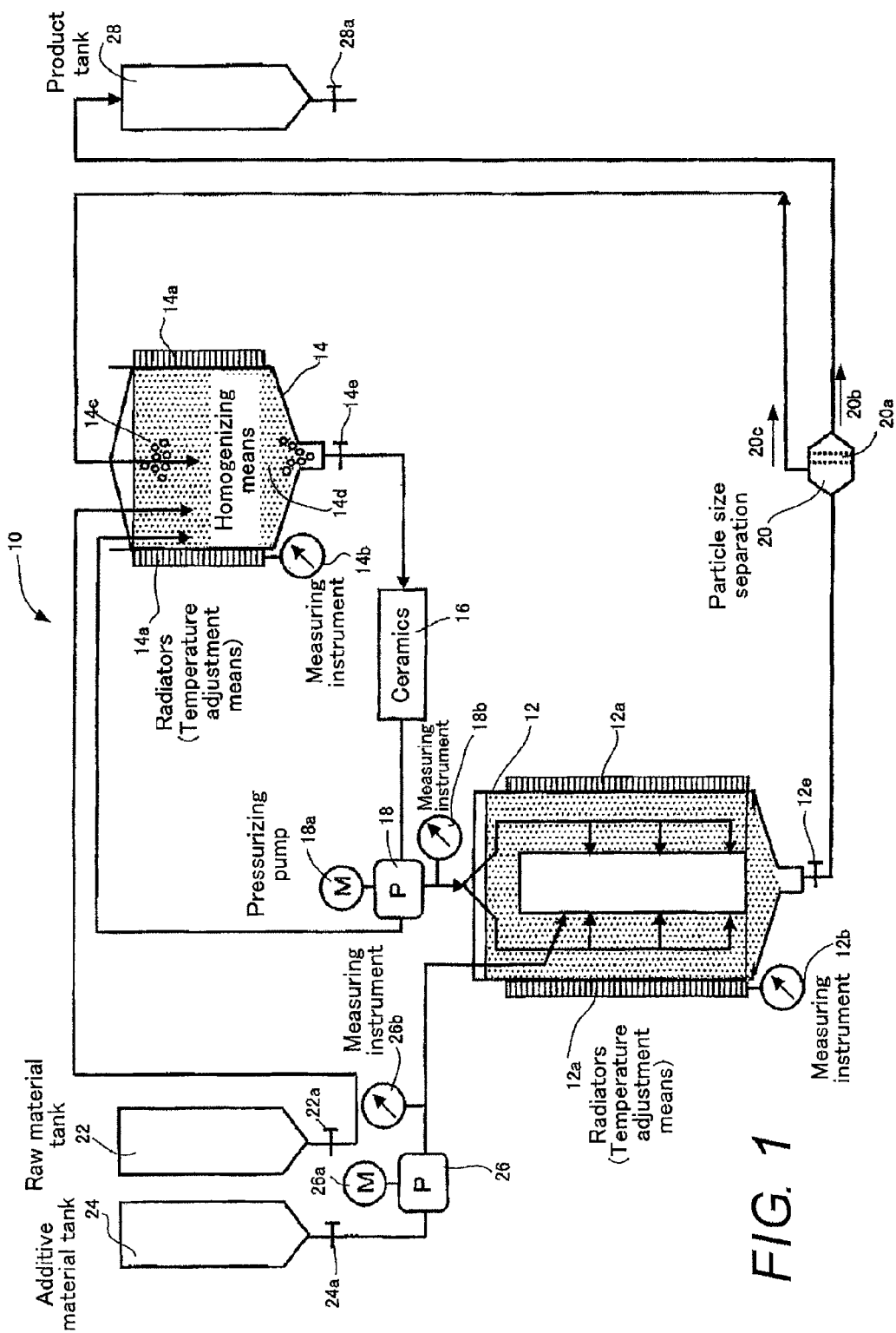
FIG. 1 shows a schematic diagram illustrating a fuel production apparatus.

EXPLANATION OF NUMERALS 10 fuel production apparatus
12, 13, 121, 302 nanobubble generating unit
14, 140 homogenizing means
16, 160 ionization means
18, 26 pump
20 particle size separation unit
22 raw material tank
24 additive material tank
26c fine particle (bubble) generation head
28 product tank
120 nanobabbule generation means
122, 122a main pipe
124 rod
126, 126a, 126b, 126c, 126d, 350, 352 nozzle
180 pressurizing means
310 main pipe
320 rod ASSY
322 solid rod
328 air nozzle
334 solid rod
340 introduction pipe
342 discharge pipe
360 container ASSY
362 external cylinder
364 side wall
410 moist hydroxy gas generation apparatus
420 nanobubble generation system

BEST MODE FOR CARRYING OUT THE INVENTION

Now, embodiments of the present invention are described below more in detail with reference to the attached drawings and the following description is provided for describing the embodiments as examples of the present invention and the present invention is not limited to the embodiments. Like symbols refer to like elements and redundant description may be omitted.

FIG. 1 is a schematic diagram illustrating a fuel production apparatus 10 according to the present invention. The fuel production apparatus 10 mainly comprises a nanobubble generating unit 12 including nanobubble generation means, homogenizing means 14, ionization means 16; and a pump 18 serving as pressurizing means. The homogenizing means 14 may include, as an example, a container, such as a tank, capable of storing a liquid like a fuel. To the homogenizing means 14, a fuel (for example, diesel oil) as a raw material is supplied via piping from a raw material tank 22 for supplying the fuel.

Radiators 14a are disposed around the homogenizing means 14 as temperature adjusting means, and serves to lower the temperature of the homogenizing means 14 when overheated. In order to carry out such a temperature adjustment, a measuring instrument 14b is provided to the homogenizing means 14 to measure a temperature, a pressure, and the like. To the homogenizing means 14, part of the fuel (the part being preferably in a low rate of the nanobubble-generation) having been once processed by the nanobubble generating unit including the nanobubble generation means is fed after being circulated by a particle size separation unit 20 as an example of separation means. According to the type of nanobubbles to be generated, the fed fuel is discharged at a high position 14c or a low position 14d in the homogenizing means so as to facilitate homogenization. In the homogenizing means 14, an agitator (not illustrated) promotes further homogenization. A pinched outlet in a tapered manner is provided to a bottom part of the homogenizing means 14 and the homogenized fuel therein is fed through piping to a ceramic device, which is an example of the ionization means 16, when a valve 14e is opened. Their details will be described later.

The ionized fuel is pressurized to have a predetermined pressure with the pump 18 driven by a motor 18a. This pressure is preferably 1 MPa or higher, more preferably 5 MPa or higher, and even more preferably 10 MPa or higher. On the other hand, it is not so preferable to apply too high pressure since a special type of apparatus may have to be employed. Furthermore, while it may be assumed that higher pressure will yield even smaller nanobubbles as will be described later, too small nanobubbles may be incorporated into the fuel by dissolution or dispersion such that it is not necessarily easy to obtain a desirable result. Accordingly, it is preferable that the applied pressure is 100 MPa or lower. Moreover, in consideration of designing an actual apparatus, it is more preferable that the pressure is 40 MPa or lower since it is not necessary to make the intermediate piping or the like special. Such a pump is commercially available and it is easy to manufacture this type of pump making a flow rate of 7 L/min with the maximum pressure of 40 MPa by using a 5.5 kW motor.

The pressurized fuel is then fed to the nanobubble generating unit 12 including the nanobubble generation means. The nanobubble generation means also requires a container having an enough size to accommodate a predetermined volume of fuel and instruments. This container is provided with radiators 12a for temperature adjustment, which adjust a temperature of the unit. Likewise, a measuring instrument 12b performs various measurements with the nanobubble generating unit 12. A valve 12e is disposed at the bottom of the nanobubble generating unit 12 including the nanobubble generation means. The fuel containing the generated nanobubbles is supplied via the particle size separation unit into a product tank 28. A predetermined amount of the fuel is stored in the product tank 28 and transferred to a container for shipping by opening a valve 28a.

The particle size separation unit 20 screens the processed fuel with a filter 20a based on the density of nanobubbles, such as nanobubles, nano-emulsions (nano-suspensions), or nano-particles. The processed fuel containing high-density nanobubbles passes through the filter 20a and is fed to the product tank 28 as shown by an arrow 20b. On the other hand, the processed fuel containing low-density nanobubbles is circulated back to the homogenizing means 14 as shown by an arrow 20c. With this procedure, a cycle is completed by linking the four components: the homogenizing means 14, the ionization means 16, the pump 18 as an example of the pressurizing means, and the nanobubble generating unit 12 including the nanobubble generation means.

Here, the circulating fuel is fed directly to a vicinity area 14d to the bottom, or to a rather vicinity area 14c to the surface of the fuel contained in the tank as an example of the homogenizing means 14, depending on the type of nanobubble contained in the fuel. For example, in the case of ultra fine bubbles like nanobubbles, their bubbles have a lower density than the fuel so as to have tendency to move upwardly in the tank. Therefore, such a fuel is directly fed to the vicinity area 14d to the bottom of the tank. In contrast to this, in the case of nanobubbles of glycerin (1.26 g/cm$^3$ [15° C.]), the fuel containing such bubbles is fed to the vicinity area 14c to the surface. In this manner, the fuel having nanobubbles distributed homogeneously can be supplied to the subsequent process.

In the nanobubble generating unit 12 including the nanobubble generation means, the processed fuel which has nanobubbles dispersed in the fuel matrix as described above by addition thereof to the fuel base can be produced. An additive material (or substance) is fed from an additive material tank 24, pressurized by a pump 26 (driven by a motor 26a) as an example of other pressurizing means when a valve 24a is opened, and is supplied, as the additive substance in a predetermined high pressure measured by a measuring instrument 26b, to the nanobubble generating unit 12 including the nanobubble generation means. The nanobubble generating unit will be described later in detail.

Figure 2:
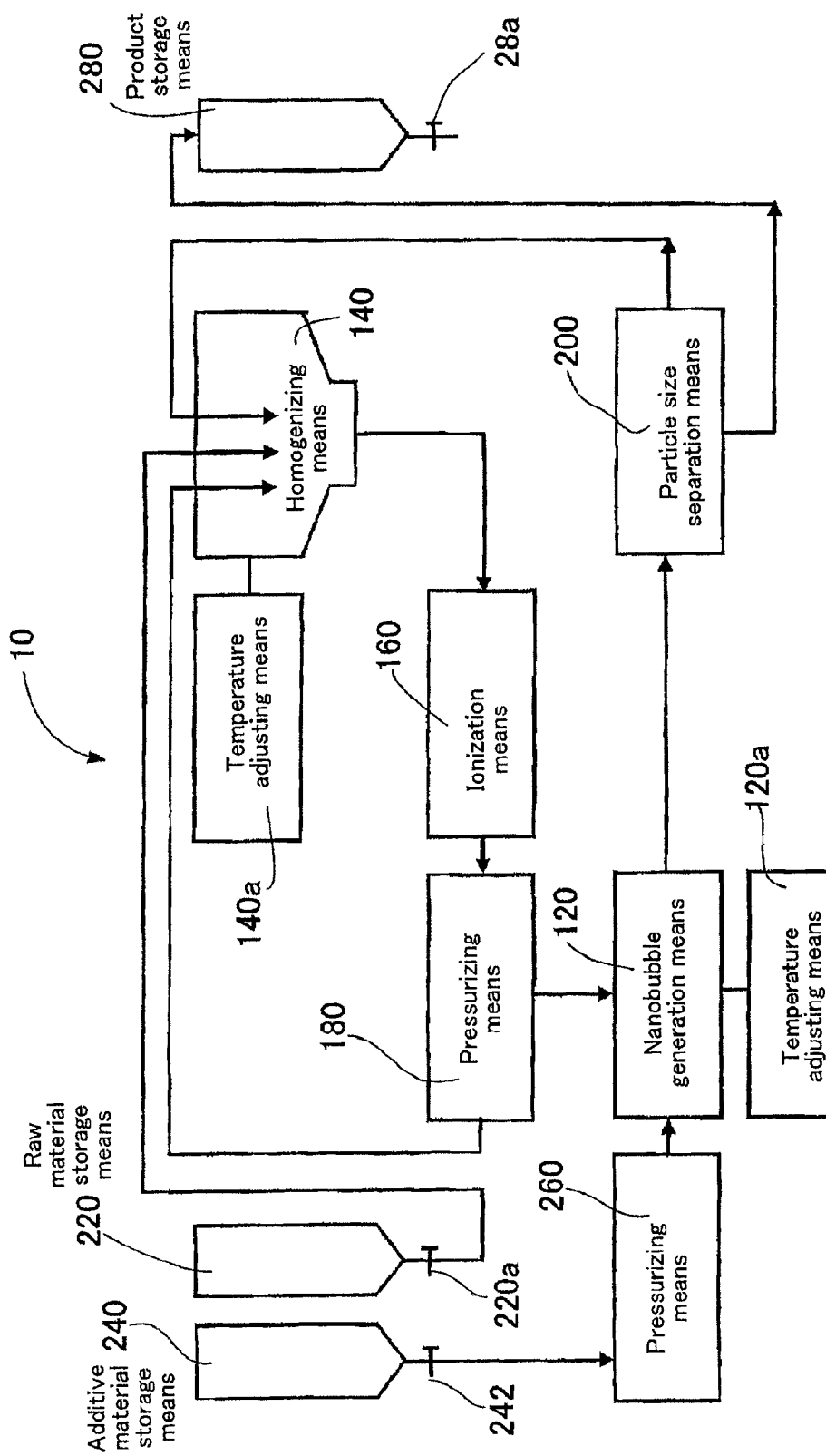
FIG. 2 shows a functional diagram illustrating the functions of the respective means of the fuel production apparatus.

FIG. 2 is a functional diagram illustrating the functions of the respective means of the fuel production apparatus 10 in FIG. 1. By opening a valve 220a, a raw material (for example, diesel oil) prepared in raw material storage means 220 is fed to homogenizing means 140 by a non-illustrated pump. The homogenizing means 140 mixes an overflow occurring from pressurizing means 180 and a processed fuel circulated after separation by particle size separation means 200, and the mixing of them is performed by a non-illustrated agitator. The homogenizing means 140 is provided with temperature adjusting means 140a, thereby enabling homogenization at a constant temperature.

The fuel homogenized in the homogenizing means 140 is then fed to ionization means 160, and ionized therein. The processed fuel is supplied to the subsequent pressurizing means.

The ceramic cylindrical body used in the ionization means 160 is a ceramic compact as disclosed in, for example, Japanese Unexamined Patent Application Publication No. H08-217421, which is made by burning a mixture of barium carbonate, titanium oxide, and aluminum oxide using clay as a binder at a temperature range of about 1000° C. to about 1500° C.

The fuel processed by the ionization means 160 is pressurized to a predetermined pressure by the pressurizing means 180, and then fed to nanobubble generation means 120. The nanobubble generation means 120 is provided with temperature adjusting means 120a, thereby enabling nanobubble generation at a constant temperature.

On the other hand, in order to add a foreign additive substance to the fuel as a base material and disperse nanobubbles in the fuel matrix, such an additive substance is fed, by opening a valve 242, from additive material storage means 240 to second pressurizing means 260. The additive substance may include, for example, various types of fluid (or liquid) such as water, ethanol, waste oil, glycerin, etc. Furthermore, the substance may also include air and inert gas such as nitrogen and argon. The fuel serving as the base material may include gasoline, diesel oil, heavy oil, etc. as examples thereof. Accordingly, combinations represented in the form of [nanobubble]/[matrix] are: air/diesel oil; ethanol/diesel oil; glycerin/diesel oil; waste oil/diesel oil; water/diesel oil; air/heavy oil; water/heavy oil, etc. Air has a density of about 0.001 $g/cm^3$, diesel oil has a density of about 0.85 $g/cm^3$, ethanol has a density of about 0.8 $g/cm^3$, water has a density of about 1 $g/cm^3$, and heavy oil has a density of about 0.9 to 1.0 $g/cm^3$. These are listed as illustrative examples only, and the present invention is not limited to these.

In the manner described above, the nanobubble generation means 120 can generate nanobubbles dispersing in the fuel matrix. The processed fuel thus obtained is separated by the particle size separation means 200 into a high-density nanobubble-generated fuel and a low-density nanobubble-generated fuel. The high-density nanobubble-generated fuel is directly fed to product storage means 280 and accumulated therein. Thereafter, when a predetermined amount is accumulated or a predetermined time reaches, a valve 28a is opened to transfer the accumulated fuel into a container for shipping. The low-density nanobubble-generated fuel is circulated back to the homogenizing means 140.

The particle size separation means 200 can separate the high-density nanobubble-generated fuel from the low-density nanobubble-generated fuel by a sedimentation method. For example, if nanobubbles have a lower density than a fuel, the bubbles tend to float because of the balance between gravity and buoyancy. Thus, if the fuel is left to stand as it is, the fuel will be bubble-rich in the upper part and bubble-lean in the lower part. Because this gravity sedimentation method is slow in the separating rate, separation by centrifugation using centrifugal force may also be employed. In addition, if the surface of the nanobubbles is positively or negatively charged, separation by an electrophoresis method may also be possible. Whatever the case, it is preferable that the separation is performed by sufficiently utilizing the properties of the nanobubble-constituting substance which is foreign to the fuel matrix.

Figure 3:
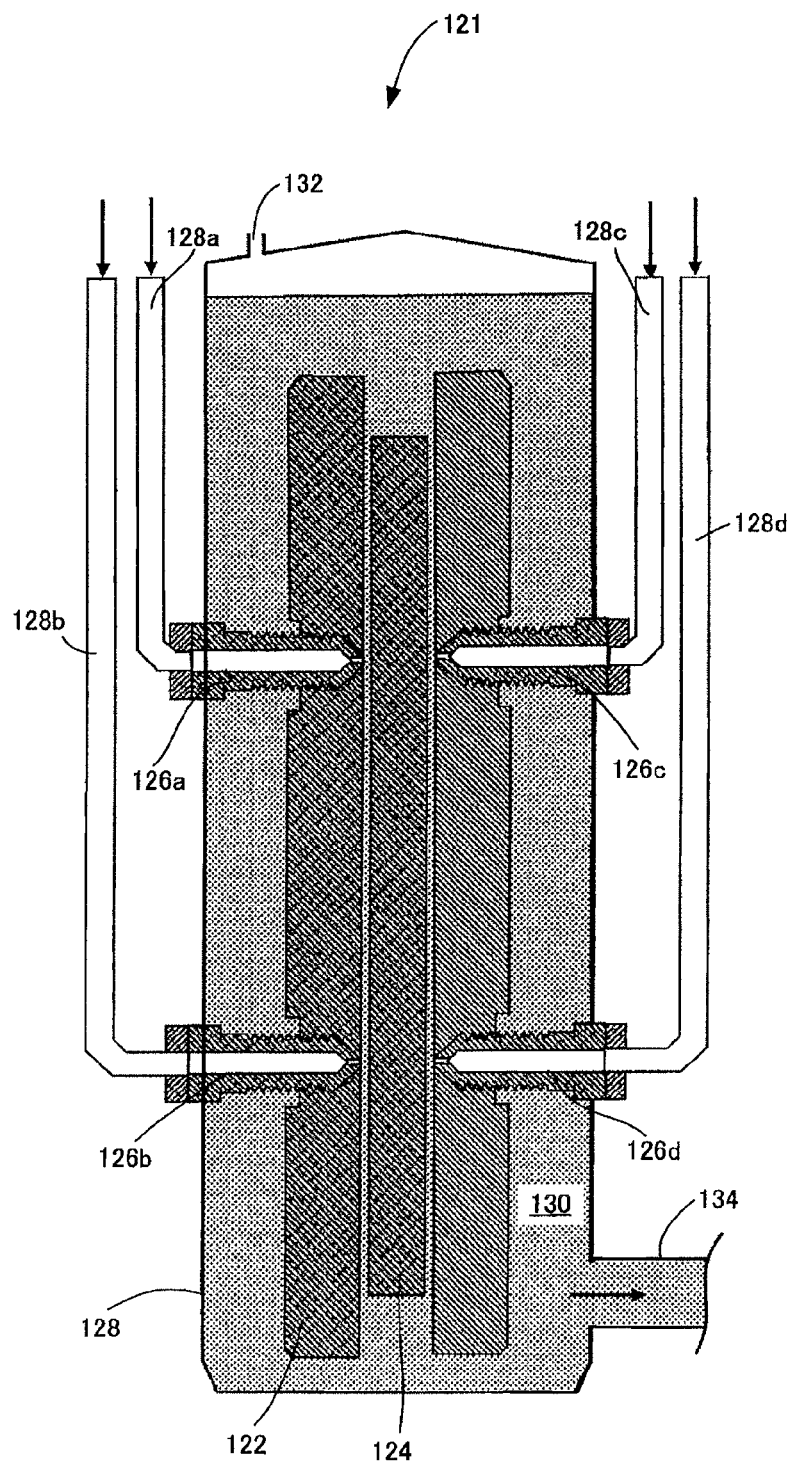
FIG. 3 is a schematic cross section view illustrating an arrangement of fixed nozzles.

A nanobubble generating unit 121 will now be described with reference to FIG. 3. The nanobubble generating unit 121 includes a container 128 containing a fuel 130, a main pipe 122 disposed inside the container 128 and immersed in the fuel, a rod 124 disposed concentric with the main pipe 122 and provided a predetermined clearance from the inner wall having the inner diameter of the main pipe, four nozzles 126a, 126b, 126c, and 126d fastened to the main pipe 122 with tapered screws, and pipe lines 128a, 128b, 128c, and 128d supplying these nozzles with a pressurized fuel or the like. The container 128 is provided with a vent 132, which prevents an abnormal increase in pressure inside the container. In addition, the bottom vicinity of the container 128 is provided with a discharge pipe 134, from which a nanobubble-generated fuel having been processed is discharged to the outside of the nanobubble generating unit 121.

The main pipe 122 is disposed at approximately the center of the container 128 in a substantially vertical direction, and is provided concentrically with the rod 124 so that the rod is fixed to maintain a predetermined clearance from the inner wall having the inner diameter all around the outer surface of the rod. The rod 124 is supported by the main pipe 122 using non-illustrated beams, and the main pipe 122 is similarly supported by the container 128. Each of the nozzles 126a, 126b, 126c, and 126d is screwed substantially in perpendicular to the axial direction of the main pipe 122, and the tips of the nozzles are pointing in a horizontal direction (that is, substantially perpendicular to a pipe wall having the inner diameter of the main pipe 122). Thus, a high-pressure fuel or the like is injected from the nozzles substantially in a horizontal direction. Since the clearance between the outer circumferential surface of the rod 124 and the inner circumferential surface of the main pipe 122 is sufficiently small, a flow of the fuel injected collides against the outer circumferential surface of the rod 124 without substantially decreasing in the speed. At this time, a point at which the jet collides perpendicularly is defined as a no-flow point (or a stagnation point) where the flow rate becomes zero. As a result, the pressure increases at this point. The consideration of this pressure will be described later. This collision induces the nanobubble generation, and the generated nanobubbles disperse in the fuel to reform the fuel.

Figure 4:
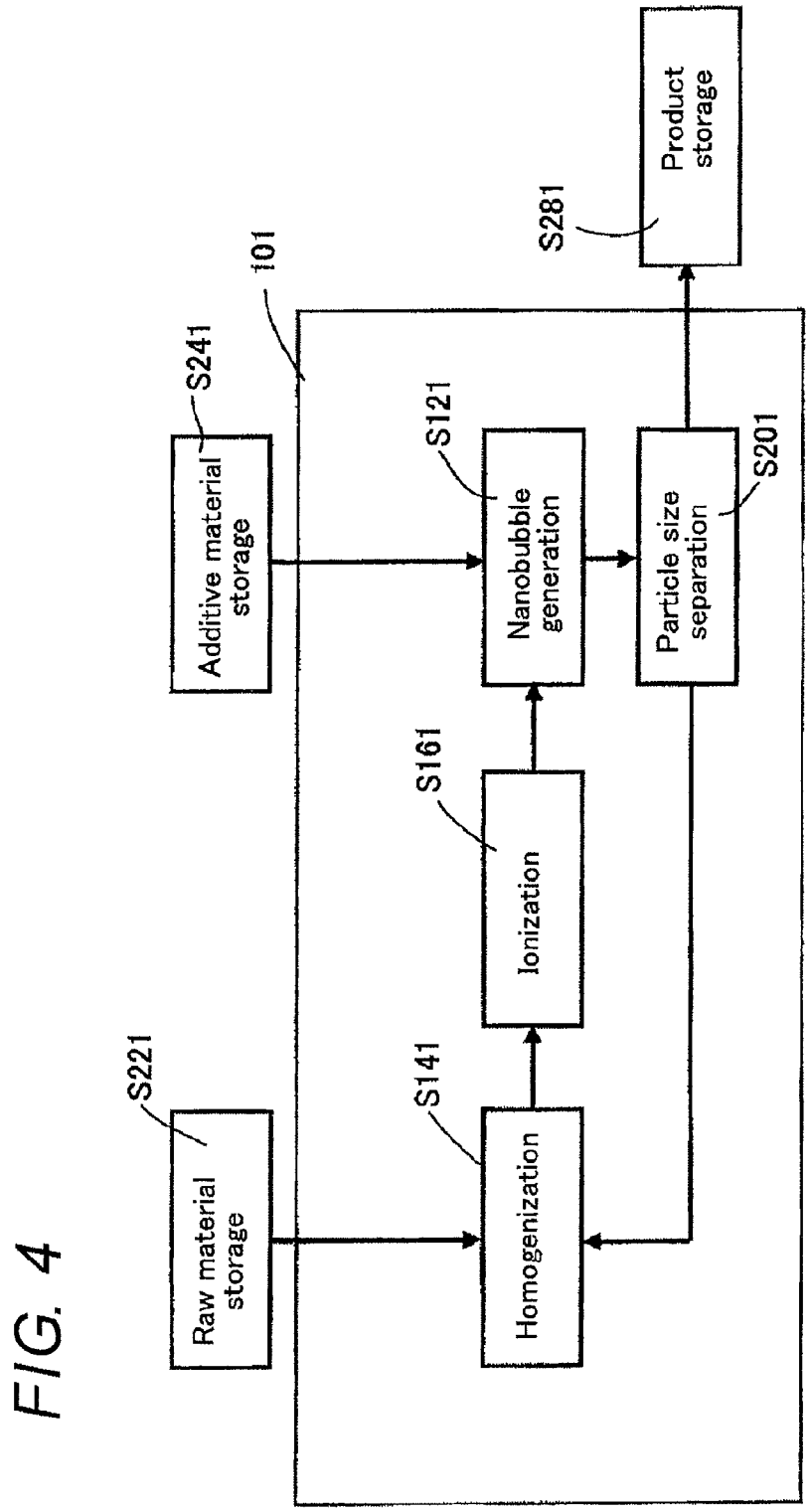
FIG. 4 illustrates processes collecting nano-bubble-generated fuel.

FIG. 4 illustrates processes for generating nanobubbles and collecting nanobubble-generated fuel. A fuel (for example, diesel oil) is stored as a raw material (S221). The stored fuel is extracted and supplied to the homogenizing means to be homogenized (S141). The homogenized fuel is then ionized (S161). The ionized fuel is pressurized and supplied to the nanobubble generation means to generate nanobubbles (S121). During this process, in order to generate a heterogeneous system, an additive material containing a foreign substance stored is taken out from where the additive material is stored (additive material storage) (S241), and similarly supplied to the nanobubble generation means. Then, nanobubbles are generated from the material, and a fuel is produced which has the nanobubbles of the foreign substance dispersing therein (S121). Subsequently, by a predetermined method, the resulting fuel is separated according to the size or density of nanobubbles (S201). The fuel with well-generated nanobubbles is shipped without any modification, and stored as a product (product storage) (S281). On the other hand, the fuel with insufficiently-generated nanobubbles is circulated to the homogenizing means to be again homogenized. Thus, a system 101 for nanobubble generation and circulation is constructed.

Figure 5:
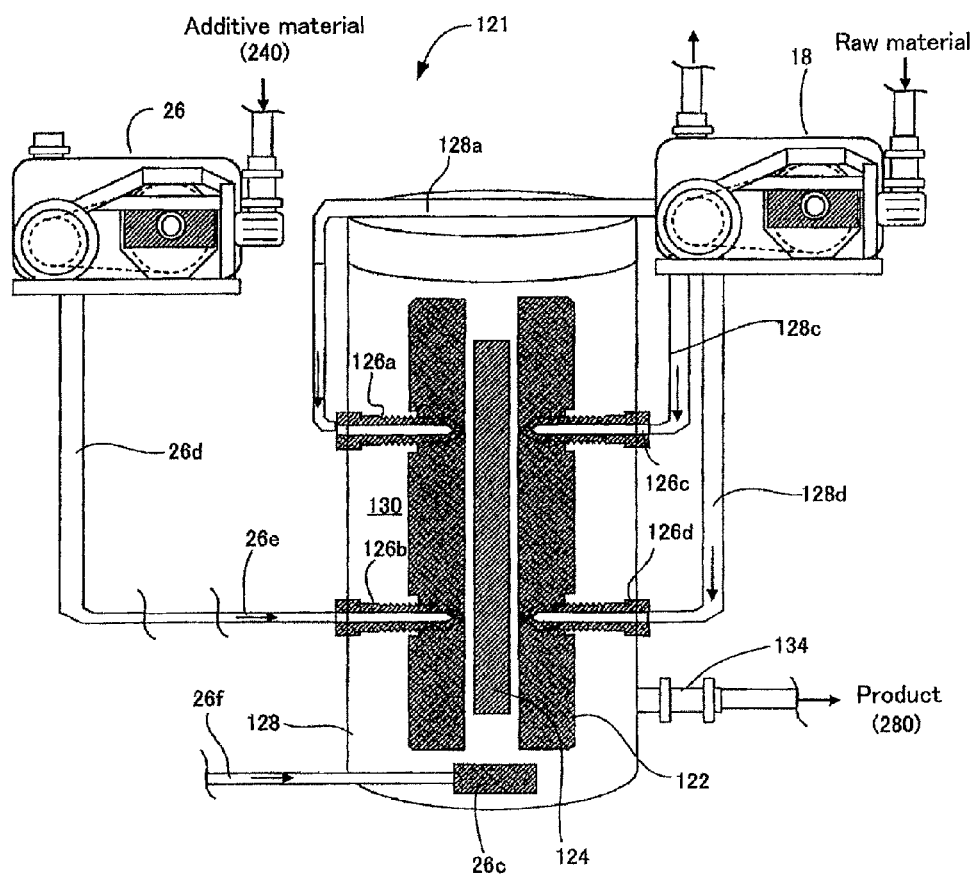
FIG. 5 is a schematic view showing a connection arrangement of nozzles and pumps.
Figure 9A:
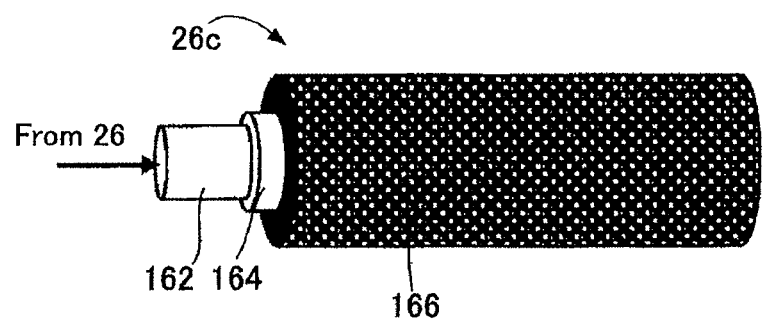
FIGS. 9A and 9B are views showing fine particle (bubble) generation head.
Figure 9B:
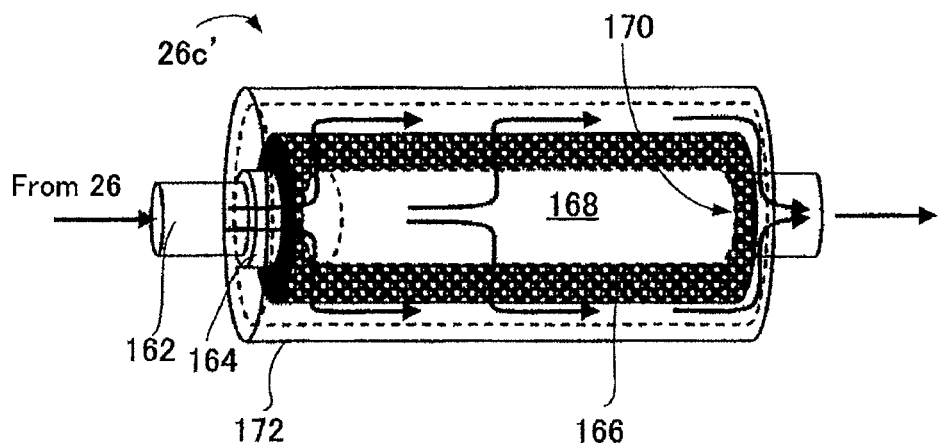

FIG. 5 illustrates a structure for the nanobubble generation, which mainly includes the nanobubble generating unit 121 including the nanobubble generation means and the pumps 18 and 26. Repeated description of the structures common with those in FIG. 3 is omitted. The fuel (for example, diesel oil) serving as a raw material is supplied to the pump 18 and pressurized. Except the fuel to be discharged as an overflow, the pressurized additive material 26e is supplied via the pipe line 128a to the nozzle 126a, via the pipe line 128c to the nozzle 126c, and via the pipe line 128d to the nozzle 126d, and injected from the respective nozzles. On the other hand, the additive material (or substance) is supplied to another pump 26 and pressurized. Except the fuel to be discharged as the overflow, the pressurized additive material 26e is supplied via a pipe line 26d to the nozzle 126b, or via the pipe line 26f to a fine particle (bubble) generation head 26c, and injected from the respective nozzles. That is, if the additive material is a gaseous substance, while a method for injecting the material directly from the nozzles may also be utilized similar to the liquid additive material, other methods may also be employed. This figure schematically shows the fine particle (bubble) generation head 26c which is an example of fine particle (bubble) generation means made of a porous ceramic capable of generating nanobubbles efficiently in consideration of gas properties. This improves in efficiency of the final nanobubble generation in a stepwise fashion such that instead of the nozzles, the porous ceramics is disposed immediately below a liquid injection orifice in the matrix, and a high-pressure gas is first injected, as medium-sized fine particles, into the matrix; and then in the next step, the gas collides with the liquid nanobubbles in an upper part to generate nanobubbles effectively. FIGS. 9A and 9B show fine particle (bubble) generation heads 26c and 26c' in detail. FIG. 9A is a perspective view illustrating the head 26c which uses uncovered porous ceramics (break filter) 166, and FIG. 9B is a perspective view illustrating the head 26c' which uses porous ceramics (break filter) 166 covered with a cover 172, with the cover 172 illustrated to be transparent. As will be understood from these figures, the porous ceramics (break filter) 166 of a grain-ear-like shape is disposed around an introduction pipe 162 and a support pipe 164. This ceramics (break filter) 166 is hollow as shown in FIG. 9B, and thus an additive substance supplied from the pump 26 as the pressurizing means is fed to the introduction pipe 162, and passes from an inside hollow portion 168 through the porous ceramics (break filter) 166 to be discharged to the outside. This hollow portion 168 is provided with an end portion 170 which serves as a stopper for the additive substance so that a gas flowed therein passes through the porous ceramics (break filter) 166. The outer side of such a processing portion lying as a core may be provided with the cylindrical body 172, which can discharge the blown-out gas from a single location. The discharged gas moves upwardly toward the liquid injection orifice in the matrix. Thereafter, by jets blown out from the nozzles 126a, 126b, 126c, and 126d, nanobubble generation is conducted.

Figure 6A:
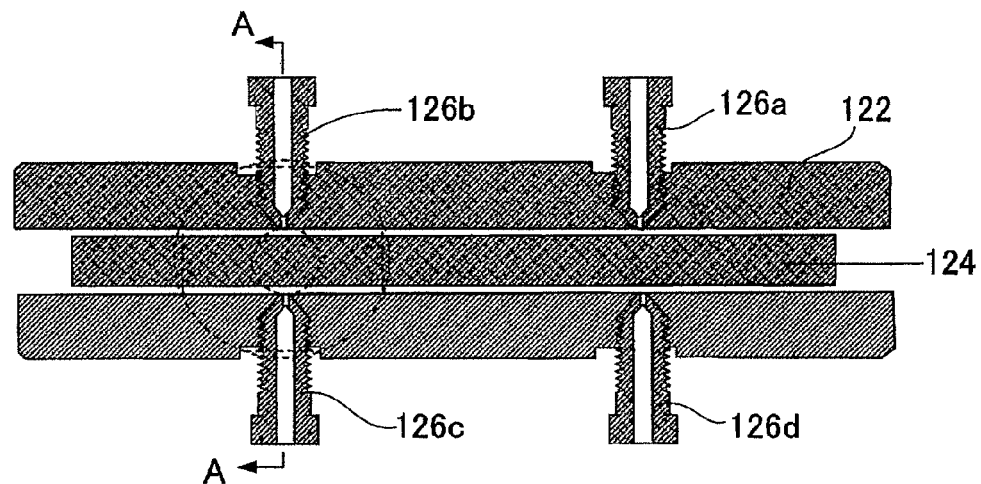
FIGS. 6A to 6C are schematic enlarged cross section views showing arrangements of fixed nozzles.
Figure 6B:
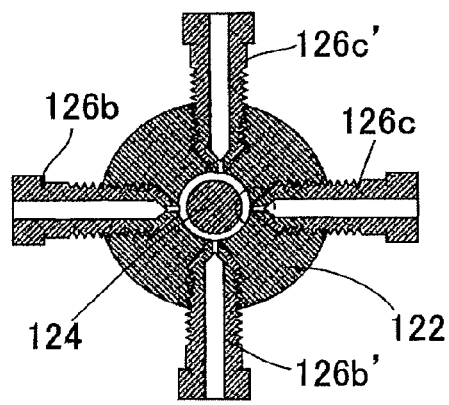
Figure 6C:
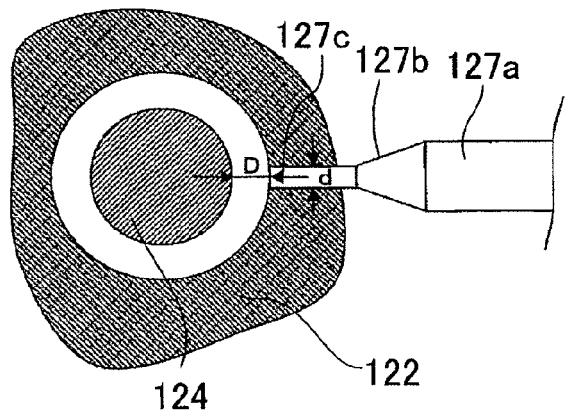

FIGS. 6A to 6C are cross section views more schematically illustrating the mechanisms of the nozzles 126a, 126b, 126c, and 126d as the nanobubble generation means and their surroundings. Repeated description of the structures common with those in FIG. 3 is omitted. FIG. 6A illustrates, in the form of a cross section view, a central member of the bubble generation means in the case where the outer circumference surface of the main pipe 122 in FIG. 3 is partly chamfered so as to screw the nozzles 126a, 126b, 126c, and 126d smoothly. FIG. 6B is a cross section view taken from the line A-A in FIG. 6A, which illustrates the nozzles 126b, 126b', 126c, and 126c' being screwed into the main pipe 122 at locations spaced 90 degrees from each other in the circumferential direction. With this arrangement, the number of stagnation points located on the outer circumference at a predetermined axial location of the rod 124 increases to four, thereby further facilitating the nanobubble generation. FIG. 6C illustrates the relation between dimensional data of the nozzle tip portion and clearance. The inner diameter of the nozzle does not vary in a range of the largest-diameter portion 127a (that is, the cross-sectional area is constant). Further toward the tip side, the longitudinal cross-section thereof has a tapered shape, that is, a funnel shape 127b so that the cross-sectional area decreases. This increases the pressure by dynamic pressure, and the pressure will be high at a portion 127c where the inner diameter gradually narrows and reaches a nearly constant diameter. Since this smaller-diameter portion is given physical or mechanical demands, such as rectification of the jet injection direction, it may preferably not be too short. For example, the length may preferably be 10 or more times as large as a diameter d of the cross-section thereof. Furthermore, the length may more preferably be 10 to 15 times as large as the diameter d. On the other hand, for non-compressible fluid, the pressure of the fluid passing through a constant cross-sectional area (inner pressure) decreases linearly. Therefore, as the flow path is too long, a sufficient jet velocity may not be attained due to the pressure losses.

Next description will be made of the clearance D from the inner circumferential surface of the main pipe 122 to the outer circumferential surface of the rod 124. Neither too wide clearance nor too narrow clearance is preferable because such a clearance cannot provide an efficient nanobubble generation. For example, the efficiency is dependent on the pressure with respect to the inner diameter d of the nozzle so that a preferable clearance is 10 to 15 times as large as the inner diameter.

Now, consideration will be made to a method for producing a fuel with nanobubbles dispersed therein, such as a water-emulsified fuel, when the nanobubble generation means according to the present invention is employed. Generally, in a W/O emulsion with water particles dispersed in a matrix of a petroleum-based fuel, such as hydrocarbons, because the water density is higher than the diesel oil density, the water particles will settle out in a short period of time depending on the size of water particles. However, if fine water particles can be generated, a stable water-emulsified fuel can be produced theoretically without using surfactant or the like.

By the Stokes' equation, a velocity of particles moving in fluid is expressed as the following.

$$Vp = a^2 \times (\rho_0 - \rho_1) \times G/(18 \times \rho_0 \times \upsilon) \qquad (1),$$

where $Vp$=particle moving velocity (m/sec),
$a$=particle diameter (m),
$\rho_0$=density of continuous phase (kg/m$^3$),
$\rho_1$=density of dispersed phase (kg/m$^3$),
$\upsilon$=kinetic viscosity of continuous (m$^2$/sec), and
$G$=gravitational acceleration 9.8 (m/sec).

With this equation, a moving velocity of water particles in the case where fine water particles are dispersed in diesel oil is calculated as follows. Here, it is assumed that the water particles have a diameter of 1 μm.

$a^2 = 1 \times 10^{-12}$ (m$^2$).
$\rho_0 = 850$ (kg/m$^3$).
$\rho_1 = 1000$ (kg/m$^3$).
$N = 3.0 \times 10^{-6}$ (m$^2$/sec).

Substituting these values into Equation (1) yields $Vp = 0.02722 \times 10^{-6}$ m/sec. Therefore, the water particles sink by 0.1 mm per hour. If the water particle diameter is 0.5 μm, the sedimentation velocity will be one fourth and, thus, the water particles will sink by 0.6 mm per day.

On the other hand, for air bubbles, the moving velocity thereof when having a bubble diameter of 1 μm is 0.1822 μm/hour, which indicates that the air bubbles move about six times as fast as the water particles. However, in the case of air, the smaller its particle diameter is, the higher the pressure in the bubbles is and the higher the density becomes. The higher the air density is, the less the difference in densities of air and diesel oil is and the smaller the moving velocity thereof is, thereby providing an increased mixing stability.

The following is what is generally said about a collapsing mechanism of water particles. When a water droplet is injected into fluid, surface tension of the liquid acts on the droplet leading edge to make the geometry spherical. However, when the droplet pushes away the stationary fluid, a no-flow point (a stagnation point) appears in a center portion of the flying-away fluid. The pressure at this location will be higher than that at any other location. This pressure can be obtained by the Bernoulli's theorem.

$$P=(\rho V^2/2) \tag{2}$$

When this pressure becomes higher than the pressure caused by the surface tension, the water droplets start to deform at the stagnation point, and will ultimately collapse into smaller water droplets. Thus, in order to provide smaller water droplets, the jet velocity should be increased (the jet injection pressure should be increased).

A liquid having a free surface has the surface tension generated. For example, in the case of water, the generated surface tension is 72 dyne/cm (the surface tension of the diesel oil is assumed to be 30 dyne/cm). In the case where a water droplet having 1 cm diameter exists in the diesel oil, the internal pressure of the water droplet is calculated as follows. The water and diesel oil have free surfaces, respectively and the surface tension Ts is given by:

$$Ts=72+30=102 \text{ (dyne/cm)}.$$

Assuming R=0.5 cm, the force caused by the generated surface tension generated around the water droplet is given by:

$$2\pi R \times Ts = 320.28 \text{ (dyne)}.$$

The cross section area of the water droplet is given by:

$$\pi R^2 = 0.785 \text{ (cm}^2\text{)}.$$

The internal pressue P is given by:

$$P = 2\pi R \times Ts/\pi R^2.$$

Therefore, the internal pressure of the water droplet is calculated to be 408.2 (dyne/cm²).

Here, assuming R=0.5 (μm), P=408.2×10⁴ (dyne/cm²). That is, the internal pressure is higher than the ambient pressure by about 4 bar. Assuming the diameter of the water particle is 100 (nm), the internal pressure may be about 40 (bar). Assuming R=10 (nm), the internal pressure may be about 400 (bar) higher. And assuming R=1 (nm), it may be about 4000 (bar).

Assuming that 100% of the kinetic energy of injection is converted into pressure, water particles can be fractured to produce finer water particles if the injection is performed at a higher pressure than the internal pressure of the water particles. To accomplish this, however, it may be necessary to stop movement of the water particles instantly. Intermittent injections may accomplish such an action to a certain extent because the injections are performed to the stationary fluid. However, in the case of continuous injection, wakes occur and fluid around the injection also moves in the same direction as the injection. This reduces a relative velocity between the injection and the surrounding fluid to reduce a capability to recover the pressure. Thereby, a higher injection pressure than the internal pressure by the surface tension will be required. In order to improve the pressure recovery of the injection, the injection velocity is desirably reduced to zero instantly. One method for attaining this may be an approach of causing collision (impingement) of an injection flow against a stationary object to break down. This approach can be used in combination to generate fine water particles efficiently. In order to suppress the flow velocity reduction by wakes, a distance between the jet outlet and a collision plate may be reduced. However, atomization to be caused by the spread of injected flow after injection may also be utilized to provide further improvement in the entire atomization efficiency. To this end, optimization of the distance between the jet outlet and the collision plate may be desirable.

As represented by Equation (1), the stability of bubble-generated fuel against separation can be evaluated from the moving velocity of the bubbles. That is, if the moving velocity is zero, no separation occurs in theory. To reduce the moving velocity to zero, as understood from Equation (1), the particle diameter may be reduced, the viscosity of fluid may be increased, or the difference in density may be lowered. If the fluid to be used has been decided, the density or the viscosity cannot be changed. Therefore, the particle diameter must be reduced. For air bubbles, however, the density thereof varies because air is compressible fluid. The pressure thereof can be expressed as a function of the bubble particle diameter. This relationship is shown in FIG. 7.

Figure 7:
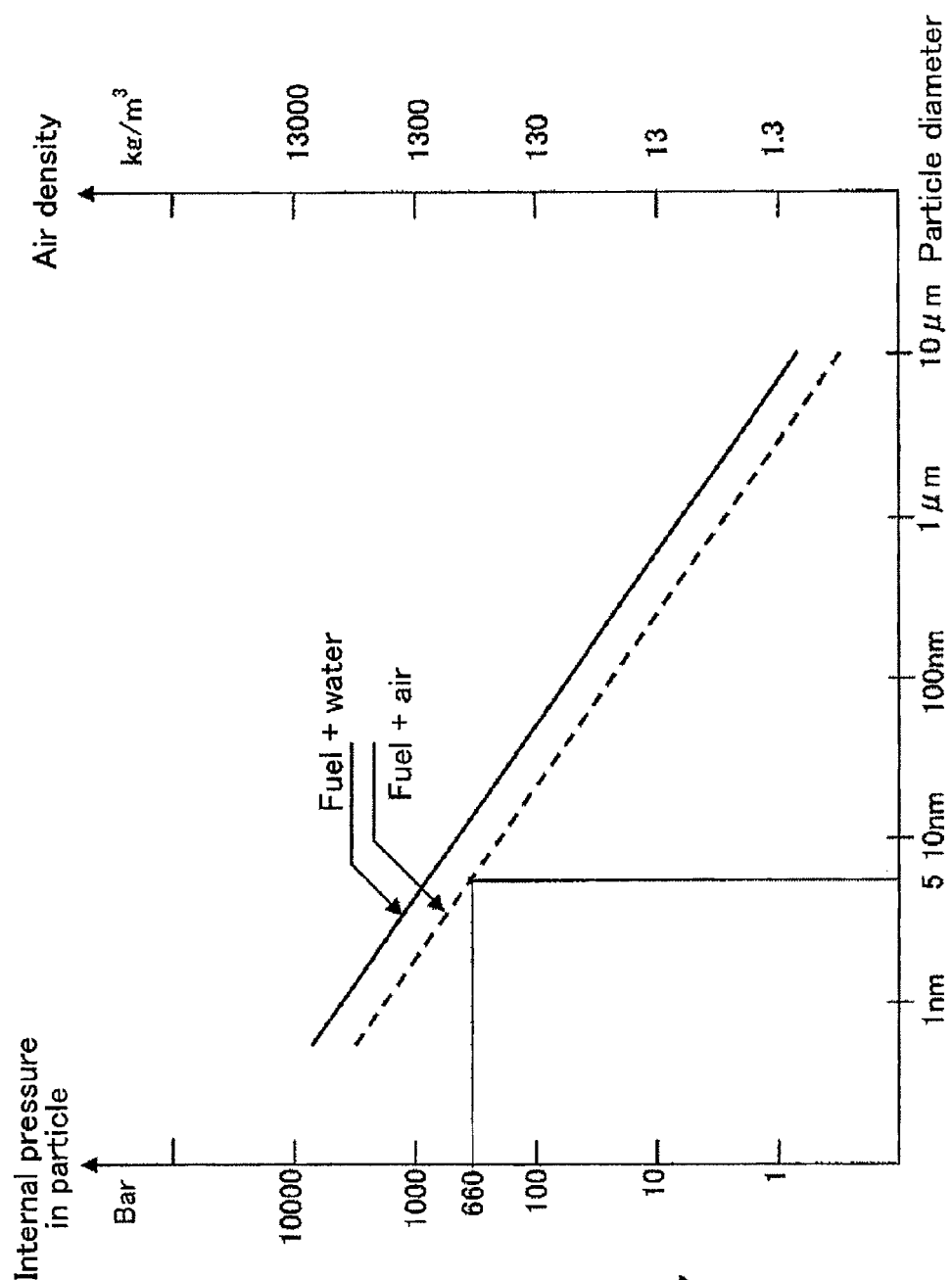
FIG. 7 is a graph showing a relationship between a particle internal pressure and a particle size.

FIG. 7 plots the internal pressure of the particles in the vertical axis and the particle diameter in the horizontal axis. In this graph, the solid line represents the profile of an emulsified fuel made of fuel and water, and the broken line represents the profile of a bubble-generated fuel made of fuel and air. Air is compressible gas. Therefore, as the pressure thereof increases, the volume decreases in inverse proportion but the amount of oxygen in the air remains the same. As a result, the density will increase. Accordingly, the air density can be plotted in the right-side vertical scale to correspond to the internal pressure in the left-side vertical scale.

As can be understood from this graph, the air density obtained when the pressure is about 660 kg/cm² is as much as 850 kg/m³ which is the same density as diesel oil, thereby preventing separation by bubble buoyancy. Thus, in this condition, the amount of air addition can be freely changed as desired. The bubble particle diameter in this condition is about 5 nm (FIG. 7). It is understood that in order to generate such bubbles, the injection pressure may preferably be about 660 kg/cm² or higher.

FIG. 8 shows the relationship between the particle diameter and the moving velocity. In this graph, the moving velocity of water or air particles is plotted in the vertical scale, while the diameter of these particles is plotted in the horizontal scale. As understood from this graph, for air bubble, if the particle diameter is about 100 nm, the moving velocity will be about 10 nm/sec, and with this, a very stable nanobubble-generated fuel can be produced.

Figure 10A:
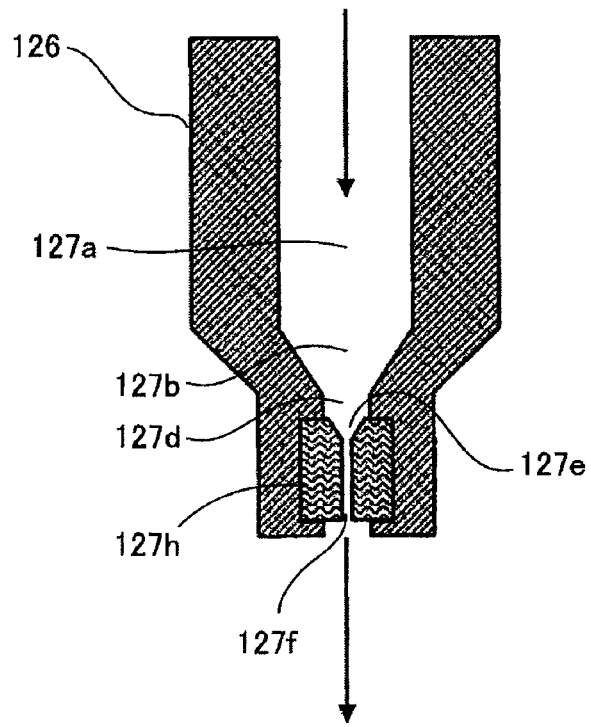
FIGS. 10A and 10B are partially enlarged cross section views illustrating details of a nozzle.
Figure 10B:
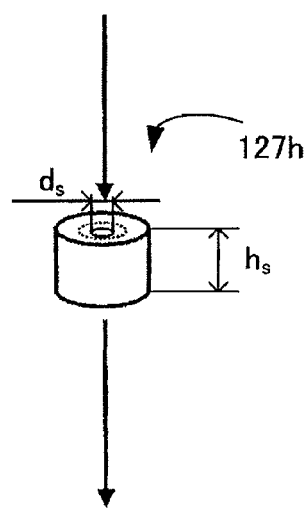

FIGS. 10A and 10B are partially enlarged cross section views illustrating the details of a nozzle 126 according to another embodiment. The nozzle 126 has a hollow portion 127a that is a cylindrical straight hole with an unchanged cross-sectional area. A leading-end side of the hollow portion 127a is provided with a tapered portion 127b of a funnel shape narrowing toward the leading-end side, and further, a leading-end side of the tapered portion 127b is provided with a narrower straight hole portion 127d. A sapphire ring 127h is press-fitted into the straight hole portion 127d to form a thinner jet path 127f. An upper side of the jet path 127f of the sapphire ring 127h is provided with a chamfered portion 127e which has a shape capable of smoothly guiding a fuel to be injected to the jet path 127f. For the hole portion of the sapphire ring, a diameter $d_s$ of the jet path 127f is preferably 0.1 to 1 mm. In this embodiment, it is 0.2 mm and a height $h_s$ of the sapphire ring is 2 mm. Here, sapphire is a single crystal of alpha aluminum oxide called "corundum". It is very hard, thus it is suitable for use in a portion subject to severe abrasive wear, such as a nozzle tip.

Figure 11:
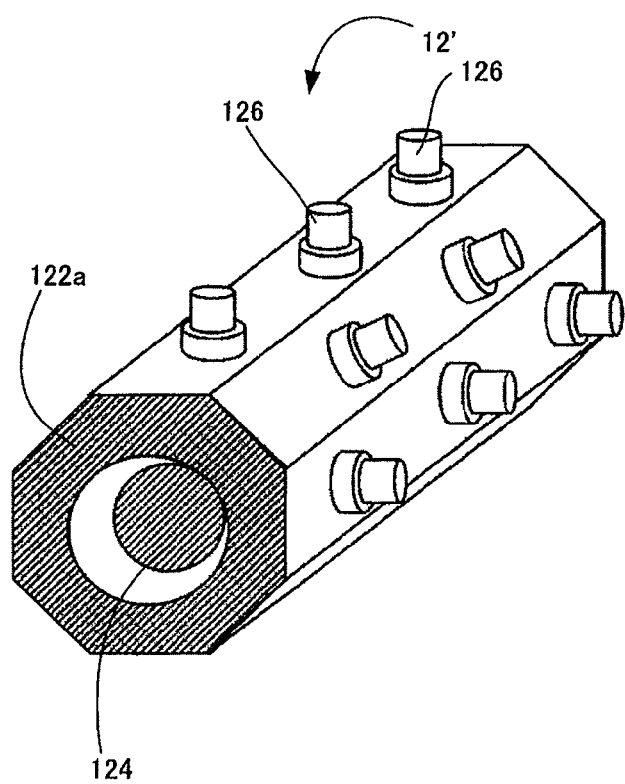
FIG. 11 is a perspective view showing another embodiment of a main pipe to which nozzles are fixed.

FIG. 11 is a perspective view illustrating a nozzle attaching portion 12' of the nanobubble generation means according to another embodiment. Similar to the nanobubble generating unit 121 as one embodiment of the nanobubble generation means 120 shown in FIG. 3, the center of a main pipe 122a is provided with the coaxial rod 124 with a predetermined clearance therebetween. A plurality of nozzles 126 are screwed from the outer circumferential surface of the main pipe 122a toward the central axis so that they extend perpendicularly to the axial direction of the main pipe 122a. The main pipe 122a has a transverse cross-section of a regular octagon, and the nozzles 126 are able to be screwed easily at locations spaced 45 degrees from each other in the circumferential direction. In this embodiment, four nozzles 126 which are screwed at locations spaced 90 degrees from each other in the circumferential direction constitute one group, and multiple groups are arranged in the axial direction of the main pipe 122a so as to be rotated alternately by 45 degrees from each other.

Figure 12:
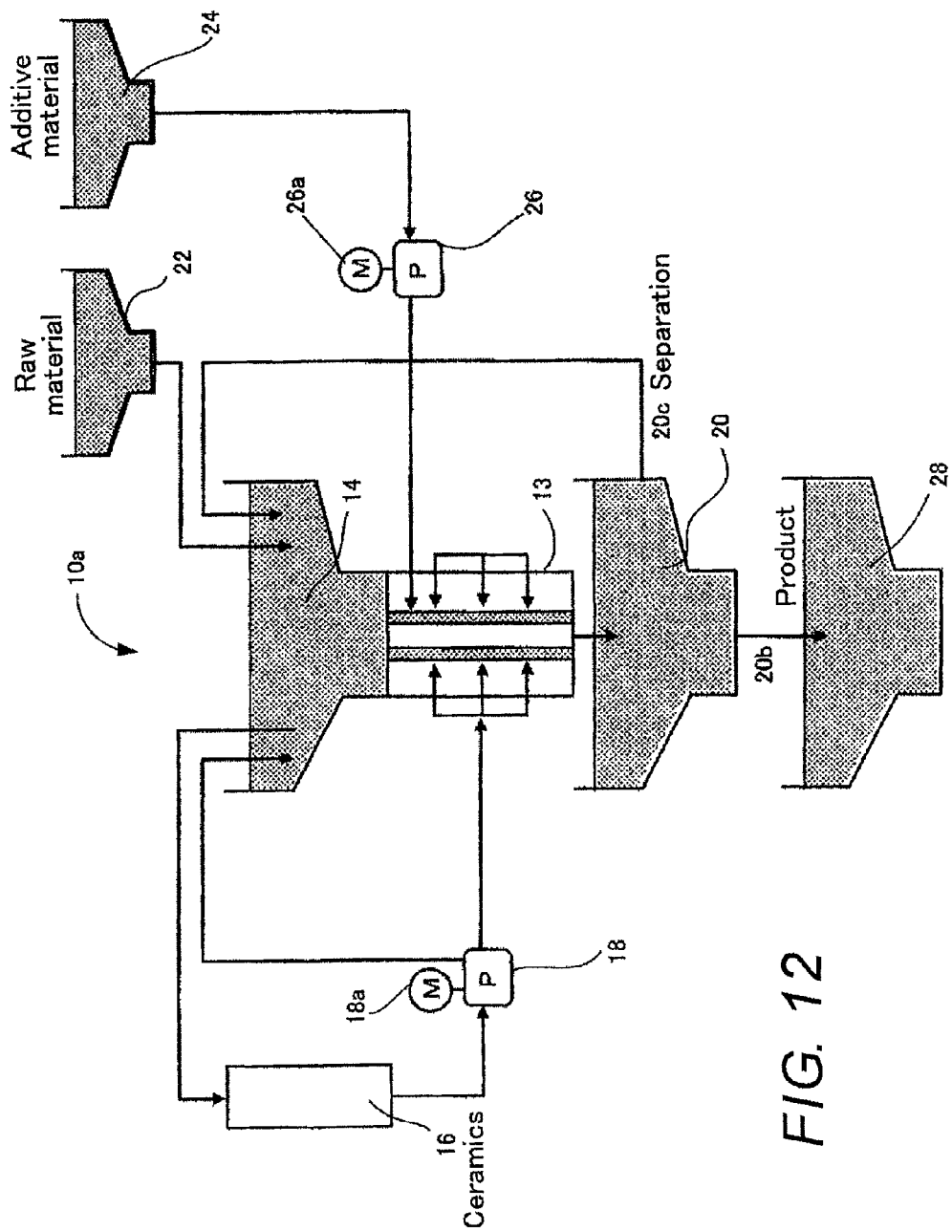
FIG. 12 is a schematic diagram illustrating a fuel production apparatus according to another embodiment.

FIG. 12 is a schematic diagram illustrating a fuel production apparatus 10a according to another embodiment. Similar to the fuel production apparatus 10 in FIG. 1, the fuel production apparatus 10a mainly includes a nanobubble generating unit 13 as an example of the nanobubble generation means, homogenizing means 14, ionization means 16, and a pump 18 as an example of the pressurizing means. The homogenizing means 14 may include, as an example, a container, such as a tank, capable of storing liquid like fuel. To the homogenizing means 14, from a raw material tank 22 for supplying fuel (for example, diesel oil) as a raw material, the fuel is fed through piping. On the other hand, an additive substance (for example, water or air) is fed from an additive material tank 24 through piping to a pump 26 as the second pressurizing means driven by a motor 26a, and the pressurized additive substance is injected by the nanobubble generating unit 13 as an example of the nanobubble generation means. The nanobubble-generated fuel thus processed is supplied to separation means 20, and then, the processed fuel with a high nanobubble density is fed to a tank 28 as an example of the product storage means (20b), while the processed fuel with a low nanobubble density is circulated again to the homogenizing means 14 (20c). Therefore, further improvement in the nanobubble density is expected.

Figure 13:
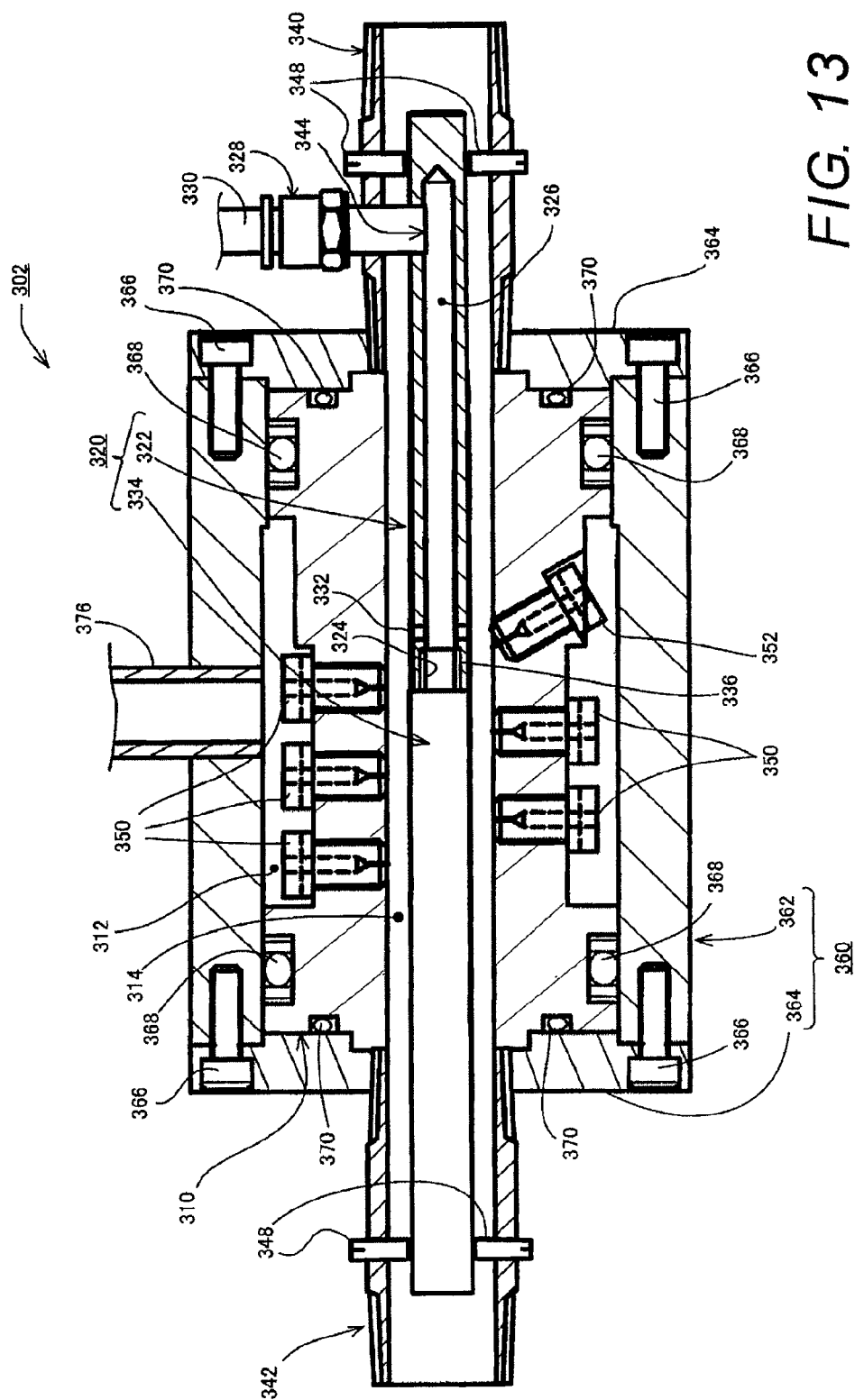
FIG. 13 is a schematic diagram illustrating a fuel production apparatus according to another embodiment.

FIG. 13 is a schematic cross section view illustrating a nanobubble generating unit 302 according to another embodiment. The nanobubble generating unit 302 mainly includes a main pipe 310 through which fuel flows, an introduction pipe 340 for allowing the fuel to flow into the main pipe 310; a discharge pipe 342 for allowing fuel to flow out of the main pipe 310, a plurality of nozzles 350 and 352 disposed around the main pipe 310 to penetrate the tube for injection of the fuel into the inside of the main pipe 310, a rod ASSY 320 disposed inside the main pipe 310 to serve as a wall against which the injected fuel collides or a wall to inject air (such as air or a gas generated by electrolysis of water (including a mixed gas)), an air nozzle 328 for supplying the air to the rod ASSY 320, and a container ASSY 360 for covering and holding the main pipe 310.

The main pipe 310 is a round pipe having a relatively large diameter and a relatively large thickness. The main pipe 310 is formed with a recess portion lying around the entire peripheral, in the center portion in the longitudinal direction, which forms a space 312 between the main pipe 310 and an external cylinder 362 described later covering the outer circumference of the main pipe 310. Six locations along the axial direction of the main pipe 310 are provided with groups of nozzles, respectively, and each of the groups has three nozzles 350 or 352. The three nozzles of each group are screwed from the space 312 toward the axial center at positions spaced 120 degrees from each other in the circumferential direction. Of the nozzle groups, the three nozzles 352 of the group on the side of the introduction pipe 340 are screwed obliquely along a traveling direction of the fuel with respect to the axis of the main pipe 310. The nozzles 350 and 352 have the same shape as the nozzle 126 previously described in FIG. 10.

The rod ASSY 320 is a round-bar member accommodated inside the main pipe 310 so as to penetrate the tube along the axial center line. The rod ASSY 320 is longer than the main pipe 310, and is inserted so that both ends thereof protrude from both end faces of the main pipe 310. In addition, the rod ASSY 320 has a smaller outer diameter than the inner diameter of the main pipe 310, and with setscrews 348, it is disposed within the internal space of the main pipe 310 to extend centrally along the axis line. Therefore, between the main pipe 310 and the rod ASSY 320, a flow space 314 for allowing the fuel to flow is formed above and below the rod ASSY 320 in FIG. 13. It has a width of about 2 to 6 mm, which is a range 20 times or less that of an ejection hole 332 (the injection diameter of a nozzle performing the discharge of air from the rod ASSY 320). In addition, the rod ASSY 320 includes a hollow rod 322 and a solid rod 334 having an elongated shape with the same diameter and the same dimension. The hollow rod 322 and the solid rod 334 are coupled by butt-joining a female threaded portion 324 at the tip of the hollow rod 322 and a male threaded portion 336 at the tip of the solid rod 334. With the two rods coupled, the hollow rod 322 is disposed upstream of the fuel flow inside the main pipe 310 (on the right-hand side in FIG. 13), while the solid rod 334 is disposed downstream of the fuel flow inside the main pipe 310 (on the left-hand side in FIG. 13). The hollow rod 322 is a cylindrical round bar with a closed end having a hollow portion 326 along the axis line, and is used so that the closed end is oriented toward upstream (toward the right-hand side in FIG. 13). The open-end side thereof is provided with the female threaded portion 324 described above, and coupled to the solid rod 334. In the hollow rod 322, the closed-end side is formed with a hole extending substantially perpendicular to the axial direction, and a female pipe thread is formed thereon. Into this hole, the air nozzle 328 with a male pipe thread formed on the tip is screwed with the nozzle sealed, thereby supplying air to the hollow portion 326. Moreover, on the open-end side of the hollow rod 322, a tubular portion other than the female threaded portion 324 is formed with multiple ejection holes 332 of small diameters. The ejection holes 332 are constructed to enable bubbling by blowing air inside the hollow portion 326 to the fuel inside the flow space 314. The solid rod 334 is a round bar, and coupled to the hollow rod 322 so that the male threaded portion 336 is directed toward upstream (toward the right-hand side in FIG. 13). The male threaded portion 336 is formed on a circular column which protrudes from the tip end of the solid rod 334, and is formed to be coupled to the female threaded portion 324.

The air nozzle 328 is connected through an air hose 330 to an air supply apparatus (not shown), and is configured to enable feeding of air to the hollow portion 326 of the hollow rod 322.

The introduction pipe 340 is a short pipe which has the same inner diameter as but has a smaller outer diameter than the main pipe 310, and the outer circumferences at both ends thereof are provided with a male pipe thread, respectively. The male pipe thread is screwed, with the thread being sealed, into a hole provided in a side wall 364 described later, whereby one end of the introduction pipe 340 is coupled to the main pipe 310. The other end is connected through an introduction connecting pipe (not shown) to an upstream raw material tank (not shown) for storing the fuel. In addition, a longitudinal center portion of the introduction pipe 340 is formed with a through-hole 344 into which the air nozzle 328 is inserted perpendicularly from the outer circumference surface of the introduction pipe 340 toward the central axis line. The through-hole 344 is provided with a female pipe thread, by which the air nozzle 328 penetrating the introduction pipe 340 is connected to the hollow rod 322. In the introduction pipe 340, locking holes (not shown) of small diameters are formed at portions on the outer circumference surface upstream of the through-hole 344 so that they substantially oppose to each other and extend perpendicularly toward the central axis line of the introduction pipe 340. The locking holes (not shown) are formed with a female pipe thread, respectively. The setscrews 348 engaging with the female pipe threads are inserted therein and then screwed with the screws being sealed, whereby the hollow rod 322 is pushed from the both sides so that the rod ASSY 320 is supported.

The discharge pipe 342 has substantially the same shape as and a similar structure to the introduction pipe 340. Specifically, it is a short pipe which has the same inner diameter as the main pipe 310 and the introduction pipe 340 but has a smaller outer diameter than the main pipe 310, and the outer circumferences at both ends thereof are formed with a male pipe thread, respectively. The male pipe thread is screwed, with the thread being sealed, into a hole provided in the side wall 364 described later, whereby one end of the discharge pipe 342 is coupled to the main pipe 310. The other end thereof is connected through a discharge connecting pipe (not shown) to a downstream particle size distribution unit (not shown) for storing the fuel. In addition, in the discharge pipe 342, locking holes (not shown) of small diameters are formed to substantially oppose to each other and extend perpendicularly from the outer circumference surface toward the central axis line of the discharge pipe 342. The locking holes (not shown) are formed with a female pipe thread, respectively. The setscrews 348 engaging with the female pipe threads are inserted therein and then fastened with the screws being sealed, whereby the solid rod 334 is pushed from the both sides so that the rod ASSY 320 is supported.

The container ASSY 360 mainly includes a pipe-shaped external cylinder 362 covering the outer circumference of the main pipe 310 in tight contact, and side walls 364 closing both ends of the external cylinder 362 accommodating the main pipe 310. The external cylinder 362 has substantially the same length as the main pipe 310 and has a slightly larger inner diameter than the outer diameter of the main pipe 310. In order for the external cylinder 362 to accommodate the main pipe 310 by coupling in a sealed condition, each of both ends of the outer circumference portion of the main pipe 310 is formed with a groove so as to interpose the space 312, and an O-ring 368 is provided therein to be interposed. In addition, the outer circumference portion of the external cylinder is formed with a hole extending in the radial direction, and a pipe 376 for supplying the fuel to the space 312 formed between the external cylinder 362 and the main pipe 310 is connected to the hole with the pipe sealed. By the interposed O-rings 368 or the like described above, the fuel fed from the pipe 376 to the space 312 is prevented from leaking to the outside. Then, the fuel supplied from the pipe 376 branches at the sealed space 312 and flows into the respective nozzles 350 and 352. Therefore, the pipe 376 is coupled to the nozzles 350 and 352 without individual piping so that the coupling to the multiple nozzles 350 and 352 can be attained with a simple structure.

Moreover, in the external cylinder 362, both end faces thereof are formed with screw holes, respectively. The external cylinder 362 accommodating the main pipe 310 has the both end faces closed by the side walls 364, and the side walls 364 are fastened with bolts 366 engaged with the screw holes. The side wall 364 is a disk member covering the entire end face of the external cylinder 362. In a center portion of a circle formed by the side wall 364, a hole is formed which has the same diameter as the introduction pipe 340 and the discharge pipe 342. The hole is formed with a female pipe thread, into which the introduction pipe 340 or the discharge pipe 342 can be screwed. Furthermore, in an outer circumferential edge portion of the side wall 364, through-holes are formed, each having a spot-facing around, and the side wall 364 is coupled to the external cylinder 362 with the bolts 366 inserted in the through-holes. In order for the side wall 364 to hermetically cover the end face of the external cylinder 362, a groove is formed outside the opening portion of the main pipe 310 described above, and an O-ring 370 is fitted into the groove. This provides the structure in which the fuel flowing inside the flow space 314 of the main pipe 310 is prevented from leaking to the outside.

Next description will be made of a method for generating nanobubbles by the nanobubble generating unit 302. A fuel pressurized to 7 MPa is fed from the introduction pipe 340 into the space 312 and flows into the openings of the nozzles 350 and 352 on the side of the space 312. Then, the fuel is injected from the tip openings of the nozzles 350 and 352 protruding to the flow space 314. Most of the injected fuel collides against the outer surface of the solid rod 334 or the hollow rod 322. Note that, during this injection, air may be supplied from the air nozzle 328 to the hollow portion 326 of the hollow rod 322 at a pressure of 0.5 MPa or less or a self-suction force caused from the venturi tube shape. The introduced air is blown out from the ejection hole 332 into the fuel flowing inside the flow space 314. Since the nozzles 352 inject the fuel obliquely, a fuel flow occurs in the flow space 314 from the right to the left in this figure. This in turn moves the fuel containing nanobubbles from the right to the left.

Hereinabove, embodiments of the present invention have been described. The fuel processed by such an apparatus may enable efficient combustions with reduced NOx generation when the fuel is combusted in, for example, an internal combustion engine such as a diesel engine.

As an example of experiment, using the fuel production apparatus described above, three types of fuels were prepared: a fuel made by adding 10% water to diesel oil and performing nanobubble generation (test sample A); a fuel made by adding air to diesel oil and performing nanobubble generation (test sample B); and a fuel by adding no particular additive substance to diesel oil and generating nanobubbles with the use of oxygen and the like dissolved in the diesel oil (test sample C). With these fuels, ignition tests as described below were conducted, and their performances were evaluated in comparison with that of an unprocessed fuel (reference sample).

A fuel ignition-combustion characteristic testing apparatus (fuel ignition analyzer: FIA-100) was employed in the tests. This analyzer is used in the manner in which a high-temperature, high-pressure air is generated in a combustor of a predetermined volume, each fuel to be tested is injected and burnt in the combustor, and various information about the combustion is obtained from a pressure change in the combustor. This analyzer can also check, with ease, an ignition delay, a combustion time, a rate of heat release, a maximum rate of heat release, and the like. The measurement principles are as follows: a high-temperature, high-pressure air is generated in the combustion chamber of the predetermined volume, each test fuel is injected and burnt in the chamber, and the various information about the combustion is obtained from the pressure change in the combustion chamber. This measurement was conducted using an FIA-100/4 (device number: 013.03.1098). Each sample was measured in the state in which, for identical atomizing properties, the fuel was heated to have a dynamic viscosity of about 20 cSt, ten injections (for one sample, 12 injections were conducted, and the first two were discarded and the remaining ten were adopted) were conducted, and the obtained data was regarded as data for one sample. The combustion conditions for the samples were all set to be identical, that is, at 45 bar and 450° C. An FIA cetane number was calculated with a calibration curve having been prepared in advance using two types of reference fuels with known cetane numbers.

In the tests, the ignition delay is set at a time of the ignition point from the injection start, that is, at a time at which a pressure rises by 0.2 bar from a reference pressure, and is defined as MD. Depending on kinds of fuels, there may be caused only a partial combustion, but may not be lead to a main combustion. From this point, it is considered that defining a substantial ignition start as the start of main combustion is more meaningful for an actual diesel engine. The substantial ignition delay is defined as a period of time until when a combustion pressure rises by 1.0 bar from the reference pressure, and the start of main combustion is defined as MD'. Combustion characteristics of a fuel are evaluated using the combustion time. The combustion time is evaluated by a period of time from the injection of fuel to 95% completion of the combustion (because a point of 100% completion of the combustion is not clear in ROHR), and this is defined as a total combustion period Mat. Another combustion characteristic is obtained by measuring a period of time from MD' to 95% completion of the combustion, and this is defined as a combustion time Mat-MD'. The combustion characteristics are evaluated by these times. Therefore, a fuel in which the above-defined times were shorter was defined to have better combustion characteristics, while a fuel in which the combustion time was longer was defined to have a poor combustion characteristic.

As a result of the tests, in comparison with the test results of the reference sample, the test sample A had almost the same cetane number. However, the total combustion period Mat and Mat-MD' were shorter and the afterburning period was also shorter. Thus, the combustion characteristics were improved. For the test sample B, the cetane number was improved, the total combustion period Mat and Mat-MD' were shorter, and the afterburning period was also shorter. Thus, the combustion characteristics were improved. Moreover, for the test sample C, the cetane number was also improved, the total combustion period Mat and Mat-MD' were shorter, and the afterburning period was also shorter. Thus, the combustion characteristics were improved.

As described above, because the fuel production apparatus according to the present invention advantageously utilizes the nanobubble generation, a fuel reformed as desired can be provided.

Note that, by supplying fine powder of a substance having a strong ionization tendency from the additive material tank to the bubble generation means, for example, use of a liquid (such as water) as a substitute for the oil enables efficient adjustment of an ORP (oxidation-reduction potential). Such water with high reducing power may be applied to preservation of the freshness of fresh food (for example, cut vegetables, fish, or the like). One example of such fine powder is power of oyster shell (native calcium carbonate) recycled, and so on.

The following is an explanation for an example of efficient ORP (oxidation-reduction potential) adjustment by performing nanobubble generation using water as a substitute for the oil. When a nanobubble generation system 430 shown in FIG. 14 used at this time is compared with the system in FIG. 5 including the nanobubble generating unit 121 and the pump 18, both structures for generating nanobubbles are substantially common. Hence, only the components different from the latter will be described.

This system 430 differs from the system of FIG. 5 in that tap water 400 is used instead of the fuel. In addition, the system 430 also differs from the system of FIG. 5 in that a generation apparatus 410 of a moist hydroxy gas (the details will be described later) may be added to the system without alternation to the structure. The generation apparatus 410 mainly includes an electrolysis vessel 412 in which electrolysis is applied to water, a pipe line 414 through which a hydroxy gas generated by the electrolysis is delivered, a porous body 418 for performing bubbling in water, a water vessel 416 in which water is stored, and a pipe line 420 through which the bubbled hydroxy gas is delivered. An upper part of the electrolysis vessel 412 is coupled through the pipe line 414 to the porous body 418 provided at a bottom portion of the water vessel 416. Thereby, the hydroxy gas generated by the water electrolysis is delivered and subjected to bubbling from the porous body 418 into water. Then, the hydroxy gas is moisturized, and gathered to an upper portion of the water vessel 416 to form a vapor phase. The pipe line 420 is connected to the upper portion of the water vessel 416, through which the moist hydroxy gas is supplied to the outside of the apparatus. Moreover, the pipe line 420 of the generation apparatus 410 is connected to pipe line 26d through a pump 422 for pressure-feeding gaseous matters, and then connected to the nozzle 126b. With this, the moist hydroxy gas in the generation apparatus 410 is fed to the nozzle 126b and injected to generate nanobubbles.

Note that, instead of the generation apparatus 410, an apparatus that can generate or supply any other type of gas may be provided. For example, an air pump may be provided to supply air to the nanobubble generating unit 121.

The hydroxy gas is defined as a mixed gas or the like of hydrogen and oxygen that can be produced by water electrolysis. For example, it is a mixed gas of hydrogen gas and oxygen gas having been just produced immediately after the electrolysis, and a mixture of these gases. Assuming that the gas subjected to the electrolysis is simply defined as a mixed gas, hydrogen and oxygen are theoretically contained in a ratio of 2:1. The moist hydroxy gas described above means a mixed gas produced in the manner in which the mixed gas is subjected to bubbling in the water (conversely, the water is aerated with the hydroxy gas) and water vapor is further added for moisturization.

Although not shown in this figure, in the pump 18, a tube for feeding various kinds of gases can be provided at a feeding port for supplying water as a raw material, thereby feeding such gases to a compression chamber of the pump.

Figure 14:
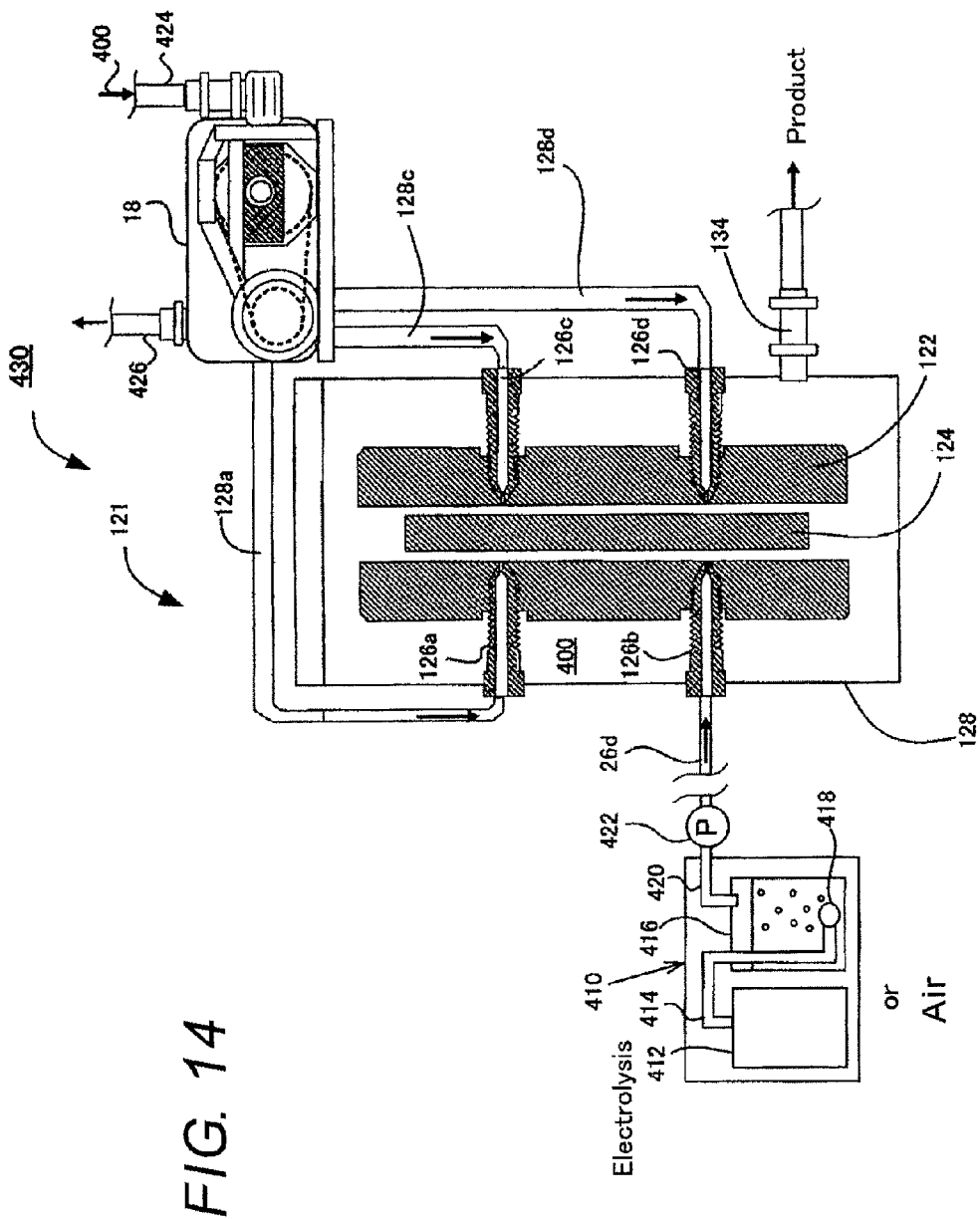
FIG. 14 is a schematic diagram illustrating a nanobubble generation system.

How nanobubbles were generated will be described according to FIG. 14. The container 128 was filled with tap water 400, and the system was prepared so that the same tap water 400 was also taken in from the water-suction port of the pump 18. In order to allow the moist hydroxy gas described above to be fed into the pipe 26d, the moist hydroxy gas was generated by the generation apparatus 410. Then, by the pump 18, the tap water 400 was pressurized to 7 MPa and the resulting water was injected from the nozzles 126a, 126c, and 126d to generate nanobubbles. In this injection, from the nozzle 126b, the moist hydroxy gas was injected. For the nanobubble-generated water thus provided, a change in ORP during the nanobubble generation process was examined by an oxidation-reduction potential measuring device provided in the container 128. Moreover, the provided nanobubble-generated water was divided into small quantities in separate containers, and they were kept hermetically at a room temperature. The ORP of the nanobubble-generated water thus kept was also measured at intervals of a predetermined keeping time.

Figure 15:
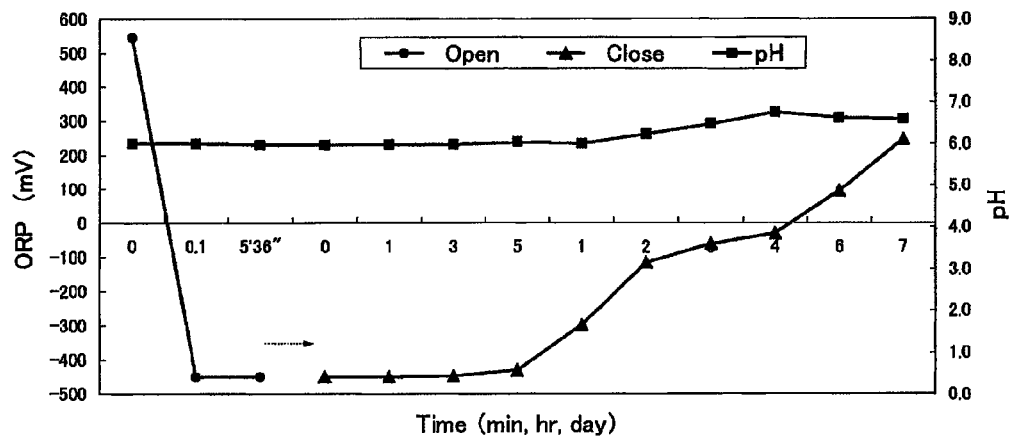
FIG. 15 is a diagram illustrates results of pH and ORP measurements of a nanobubble-generated tap water.

FIG. 15 illustrates the results of pH and ORP (oxidation-reduction potential) measurements on the nanobubble-generated water described above. The upper table is a summary of the measured values, while the lower graph is a plot of the values versus time. In this plot, the filled squares represent the measured values of the pH, the filled circles represent the measured values of the ORP obtained during the nanobubble-generation process, and the filled triangles represent the measured values of the ORP of the nanobubble-generated water kept after the nanobubble-generated water production, which are plotted with respect to the keeping time. When the nanobubble-generation process was started, the ORP (oxidation-reduction potential) decreased immediately to −450 mV but the pH remained at almost 6. Even though the same process was continued for five minutes, the ORP and pH values did not change. This nanobubble-generated water was kept in the airtight containers and their ORP and pH were evaluated. Then, until three hours later from the keeping, the both measured values hardly changed. However, from about five hours later from the keeping, the ORP gradually rose to about −300 mV. During one to three days later from the keeping, the ORP was about −100 mV, and from four days later from the keeping, it turned to positive. However, even at seven days later from the keeping, the ORP was only about 250 mV, which was a smaller value than that of the tap water as a raw material, that is, about 450 mV. As described above, with this nanobubble-generation process, the ORP (oxidation-reduction potential) can be adjusted efficiently.

What is claimed is:

1. An apparatus for production of nanobubbles within a fluid matrix, comprising:
   a pressurizer for pressurizing fluid at 5 MPa or higher to form a pressurized fluid;
   a nozzle, having a hole of a diameter Dn, for injecting the pressurized fluid into a substantially static, lower pressure fluid matrix to form an injected fluid; and
   a collision wall, disposed a distance Dw from the nozzle, for colliding the injected fluid against to create nanobubbles in the fluid matrix;
   wherein the diameter Dn is not less than 0.1 mm and not more than 1 mm;
   wherein the diameter Dn and the distance Dw are related by the formula Dw equals Dn multiplied by a variable V, with the variable V being not less than 10 and not more than 15;
   wherein the nanobubbles consist essentially of hydrogen,
   wherein the apparatus further comprises:
   a fluid store for storing fluid to be pressurized; and
   a pipe for returning the fluid matrix with the created nanobubbles to the fluid store.

2. The apparatus of claim 1, further comprising:
   a collector having collector walls for capturing the fluid matrix with nanobubbles;
   wherein the collision wall is disposed within and is different than the collector walls.

3. The apparatus of claim 2, further comprising:
   a pipe disposed within the collector walls;
   wherein the nozzle is attached to the pipe and the collision wall is disposed within the pipe.

4. The apparatus of claim 1, further comprising:
   an ionizer for ionizing the fluid;
   wherein the fluid pressurized by the pressurizer is the ionized fluid.

5. The apparatus of claim 1, wherein the collision wall is in the form of a rod.

* * * * *